US012432697B2

(12) United States Patent
Dong et al.

(10) Patent No.: US 12,432,697 B2
(45) Date of Patent: Sep. 30, 2025

(54) METHOD AND COMMUNICATIONS APPARATUS FOR CONFIGURING SIDELINK TRANSMISSION RESOURCE

(71) Applicant: HUAWEI TECHNOLOGIES CO., LTD., Guangdong (CN)

(72) Inventors: Lei Dong, Shanghai (CN); Jinfang Zhang, Shenzhen (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 434 days.

(21) Appl. No.: 17/671,572

(22) Filed: Feb. 14, 2022

(65) Prior Publication Data
US 2022/0174648 A1  Jun. 2, 2022

Related U.S. Application Data

(63) Continuation of application No. PCT/CN2019/101191, filed on Aug. 16, 2019.

(51) Int. Cl.
*H04W 72/02* (2009.01)
*H04L 1/18* (2023.01)
(Continued)

(52) U.S. Cl.
CPC ........... *H04W 72/02* (2013.01); *H04L 1/1812* (2013.01); *H04W 72/0446* (2013.01); *H04W 72/0453* (2013.01); *H04W 72/23* (2023.01)

(58) Field of Classification Search
CPC ............. H04W 72/02; H04W 72/0446; H04W 72/0453; H04W 72/23; H04W 4/40;
(Continued)

(56) References Cited

U.S. PATENT DOCUMENTS

2012/0069790 A1\* 3/2012 Chung ................. H04W 72/23
370/329
2012/0163252 A1 6/2012 Ahn et al.
(Continued)

FOREIGN PATENT DOCUMENTS

CN    104823400 A    8/2015
CN    105813204 A    7/2016
(Continued)

OTHER PUBLICATIONS

Fujitsu, Discussion on HARQ-ACK feedback for NR-V2X. 3GPP TSG RAN WG1 #96, Athens, Greece, Feb. 25-Mar. 1, 2019, R1-1901944, 8 pages.
(Continued)

*Primary Examiner* — Walli Z Butt
*Assistant Examiner* — Thad N Defauw

(57) ABSTRACT

A method for configuring a sidelink transmission resource is provided, including sending, by a network device, downlink control information (DCI) to a first terminal apparatus, the DCI comprising one or both of a first indication information or a second indication information. The first indication information indicating a time domain resource on which the first terminal apparatus sends sidelink hybrid automatic repeat request (HARQ) information to the network device, and the second indication information indicating a frequency domain resource on which the first terminal apparatus sends the HARQ information to the network device. The method further includes receiving, by the network device, the HARQ information from the first terminal apparatus based on the one or both of the first indication information or the second indication information.

15 Claims, 6 Drawing Sheets

(51) Int. Cl.
*H04L 1/1812* (2023.01)
*H04W 72/04* (2023.01)
*H04W 72/0446* (2023.01)
*H04W 72/0453* (2023.01)
*H04W 72/23* (2023.01)

(58) Field of Classification Search
CPC ... H04W 4/70; H04W 76/14; H04W 72/1263; H04W 72/20; H04W 72/51; H04W 72/53; H04W 92/18; H04L 1/1812; H04L 5/0005; H04L 5/0053; H04L 27/26025; H04L 1/1861; H04L 1/1864; H04L 5/0055; H04L 5/0094; H04L 1/1854; H04L 2001/0093; H04L 5/0007; H04L 5/0092
See application file for complete search history.

(56) References Cited

U.S. PATENT DOCUMENTS

| | | | |
|---|---|---|---|
| 2015/0002334 A1* | 1/2015 | Lim | G01S 5/10 342/357.47 |
| 2017/0188406 A1* | 6/2017 | Baligh | H04W 40/16 |
| 2017/0353971 A1 | 12/2017 | Gupta et al. | |
| 2018/0324848 A1* | 11/2018 | Baghel | H04W 88/04 |
| 2019/0044667 A1 | 2/2019 | Guo et al. | |
| 2019/0116007 A1 | 4/2019 | Yi et al. | |

FOREIGN PATENT DOCUMENTS

| | | |
|---|---|---|
| CN | 106793092 A | 5/2017 |
| CN | 108347313 A | 7/2018 |
| CN | 108923894 A | 11/2018 |
| CN | 109474375 A | 3/2019 |
| CN | 109792326 A | 5/2019 |
| CN | 109792369 A | 5/2019 |
| CN | 109792594 A | 5/2019 |
| CN | 109802783 A | 5/2019 |
| CN | 110034878 A | 7/2019 |
| EP | 3905569 A1 | 11/2021 |
| WO | 2018131922 A1 | 7/2018 |
| WO | 2018137129 A1 | 8/2018 |
| WO | 2019029498 A1 | 2/2019 |

OTHER PUBLICATIONS

Samsung, Considerations on Sidelink HARQ Procedure. 3GPP TSG RAN WG1 #96, Athens, Greece, Feb. 25-Mar. 1, 2019, R1-1902278, 11 pages.

Lenovo, Motorola Mobility, Discussion on physical layer procedures for NR sidelink[online], 3GPP TSG RAN1 WG #96b R1-1904579, Apr. 3, 2019,total 7 pages.

Vivo, Discussion on mode 1 resource allocation mechanism[online], 3GPP TSG RAN WG1 #97 R1-1906138, May 1, 2019,total 14 pages.

ITL, Discussion on NR V2X HARQ mechanism[online], 3GPP TSG RAN WG1 adhoc_NR_AH_1901 R1-1901146, Jan. 11, 2019, total 6 pages.

3GPP TSG RAN WG1 Meeting #97, R1-1906315,On Mode 1 resource allocation in NR V2X,CATT,Reno, USA, May 13-17, 2019,total 4 pages.

3GPP TSG RAN WG1 #97,R1-1906948,On Sidelink HARQ Procedure, Samsung,Reno,USA, May 13-17, 2019, total 11 pages.

Hanbyul Seo, 5G V2X with NR sidelink. Status Report to TSG, 3GPP TSG RAN meeting #84, Newport Beach, USA, Jun. 3-6, 2019, RP-190983, 38 pages.

Lenovo, Motorola Mobility, Discussion on resource allocation for NR sidelink Mode 1. 3GPP TSG RAN WG1 #97, Reno, USA, May 13 17, 2019, R1-1906268, 4 pages.

3GPP TSG RAN WG1 Meeting #95,R1-1813210,Discussion on HARQ feedback and CSI acquisition in NR Sidelink, Sharp,Spokane, USA, Nov. 12-16, 2018,total 3 pages.

3GPP TS 38.212 V15.6.0 (Jun. 2019),3rd Generation Partnership Project;Technical Specification Group Radio Access Network;NR;Multiplexing and channel coding(Release 15), total 101 pages.

3GPP TSG RAN WG1 #97,R1-1906206,NR Sidelink Resource Allocation Mechanism Mode 1,NTT Docomo, Inc., Reno, USA, May 13-17, 2019,total 6 pages.

3GPP TS 38.211 V15.6.0 (Jun. 2019),3rd Generation Partnership Project;Technical Specification Group Radio Access Network;NR;Physical channels and modulation(Release 15), total 97 pages.

3GPP TS 38.213 V15.6.0 (Jun. 2019),3rd Generation Partnership Project;Technical Specification Group Radio Access Network;NR;Physical layer procedures for control(Release 15), total 107 pages.

3GPP TS 38.214 V15.6.0 (Jun. 2019),3rd Generation Partnership Project;Technical Specification Group Radio Access Network;NR;Physical layer procedures for data(Release 15), total 105 pages.

* cited by examiner

METHOD AND COMMUNICATIONS APPARATUS FOR CONFIGURING SIDELINK TRANSMISSION RESOURCE

CROSS-REFERENCE TO RELATED APPLICATIONS

This application is a continuation of International Application No. PCT/CN2019/101191, filed on Aug. 16, 2019, the disclosure of which is hereby incorporated by reference in its entirety.

TECHNICAL FIELD

This application relates to the internet of things field, and more specifically, to a method and a communications apparatus for configuring a sidelink transmission resource.

BACKGROUND

As wireless communications technologies develop, a 3rd generation partnership project (the 3rd generation partnership project, 3GPP) proposes an internet of vehicles technology for vehicle-to-everything (V2X) in a long term evolution (LTE) network. In LTE-V2X, there are two resource allocation modes. One mode is that a transmission resource is allocated by a base station, which is defined as a mode 3 in an LTE standard. The other mode is that a transmission resource is allocated by user equipment itself, which is defined as a mode 4 in the LTE standard. In the mode that the transmission resource is allocated by the base station, parameter configurations in time domain resources for sending a physical sidelink control channel (PSCCH) and a physical sidelink shared channel (PSSCH) are closely related to LTE user equipment (UE) and a frame structure design.

However, in comparison with LTE-V2X, a new radio (NR)-V2X technology needs to support more complex scenarios, for example, unicast and broadcast scenarios, and NR-V2X has a high reliability requirement. In addition, in the mode that the transmission resource is allocated by the base station, to enable a base station to obtain more information, to adaptively adjust a sidelink modulation order and a sidelink code rate. Therefore, in addition to that receiver UE in sidelink communication needs to feed back sidelink hybrid automatic repeat request (HARQ) information to transmitter UE, and the transmitter UE further needs to feed back the sidelink HARQ information to the base station.

However, a corresponding mechanism for feeding back the sidelink HARQ information is not yet designed in NR. In addition, in comparison with a procedure that the base station feeds back downlink HARQ information in NR, an overall procedure of feeding back the sidelink HARQ information may be more complex.

Therefore, a feasible mechanism for feeding back the sidelink HARQ information needs to be provided for long-term development of a V2X technology.

SUMMARY

This application provides a method and a communications apparatus for configuring a sidelink transmission resource, to provide a solution for feeding back sidelink HARQ information.

According to a first aspect, this application provides a method for configuring a sidelink transmission resource. The method includes: A first terminal apparatus receives downlink control information DCI from a network device, where the DCI includes first indication information and/or second indication information, the first indication information is used to indicate a time domain resource on which the first terminal apparatus sends sidelink hybrid automatic repeat request HARQ information to the network device, and the second indication information is used to indicate a frequency domain resource on which the first terminal apparatus sends the HARQ information to the network device; the first terminal apparatus receives the HARQ information from a second terminal apparatus; and the first terminal apparatus sends the HARQ information to the network device based on the first indication information and/or the second indication information.

In the technical solution of this application, the network device sends the DCI to a transmit end apparatus in sidelink communication, and the DCI is used to indicate a configuration of a time-frequency resource on which the transmit end apparatus feeds back the sidelink HARQ information to the network device. In this way, a sidelink terminal apparatus can feed back the sidelink HARQ information to the network device.

The network device obtains the sidelink HARQ information, and may further adaptively adjust a sidelink modulation order, a sidelink code rate, or the like, to improve sidelink communication quality.

According to a second aspect, this application provides a method for configuring a sidelink transmission resource. The method includes: A network device sends downlink control information DCI to a first terminal apparatus, where the DCI includes first indication information and/or second indication information, the first indication information is used to indicate a time domain resource on which the first terminal apparatus sends sidelink hybrid automatic repeat request HARQ information to the network device, and the second indication information is used to indicate a frequency domain resource on which the first terminal apparatus sends the HARQ information to the network device; and the network device receives the HARQ information from the first terminal apparatus based on the first indication information and/or the second indication information.

In some implementations of the first aspect or the second aspect, that the first indication information is used to indicate a time domain resource on which the first terminal apparatus sends the sidelink HARQ information to the network device includes: The first indication information is used to indicate a time interval from a time domain resource on which the first terminal apparatus receives the HARQ information sent by a second terminal apparatus to the time domain resource on which the first terminal apparatus sends the HARQ information to the network device.

In some implementations of the first aspect or the second aspect, that the first indication information is used to indicate a time interval from a time domain resource on which the first terminal apparatus receives the HARQ information sent by a second terminal apparatus to the time domain resource on which the first terminal apparatus sends the HARQ information to the network device includes:

The first indication information includes a first field or a second field, the first field is used to indicate one first time interval, and the second field is used to indicate one second time interval, where the first time interval is a time interval from a first time domain resource to a second time domain resource, the first time domain resource is a time domain resource on which the first terminal apparatus receives first HARQ information from the second terminal apparatus, the second time domain resource is a time domain resource on which the first terminal apparatus sends the first HARQ information to the network device, and the first HARQ information is feedback information for a PSCCH on which an initial transmission is performed and/or a PSSCH on which an initial transmission is performed; and the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

In this embodiment, the first field or the second field included in the first indication information may provide, for a terminal apparatus, the time domain resource on which the sidelink HARQ information is sent to the network device, and the network device may further adaptively adjust a sidelink modulation order, a sidelink code rate, or the like by using the sidelink HARQ information, thereby improving sidelink communication quality.

In some implementations of the first aspect or the second aspect, that the first indication information is used to indicate a time interval from a time domain resource on which the first terminal apparatus receives the HARQ information sent by a second terminal apparatus to the time domain resource on which the first terminal apparatus sends the HARQ information to the network device includes:

The first indication information includes a first field and one or more second fields, the first field is used to indicate a first time interval, and the one or more second fields are used to indicate one or more second time intervals, where the first time interval is a time interval from a first time domain resource to a second time domain resource, the first time domain resource is a time domain resource on which the first terminal apparatus receives first HARQ information from the second terminal apparatus, the second time domain resource is a time domain resource on which the first terminal apparatus sends the first HARQ information to the network device, and the first HARQ information is feedback information for a PSCCH on which an initial transmission is performed and/or a PSSCH on which an initial transmission is performed; and the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

In this embodiment, the first field and the one or more second fields included in the first indication information may respectively indicate the first time interval corresponding to an initial transmission and the one or more second time intervals respectively corresponding to one or more retransmissions. This avoids a case in which in a flexible and variable frame structure of NR, a PUCCH resource cannot be determined because only one time interval is indicated.

In some implementations of the first aspect or the second aspect, that the first indication information is used to indicate a time interval from a time domain resource on which the first terminal apparatus receives the HARQ information sent by a second terminal apparatus to the time domain resource on which the first terminal apparatus sends the HARQ information to the network device includes:

The first indication information includes a plurality of second fields, and the plurality of second fields are used to indicate one or more second time intervals, where the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

In this embodiment, the plurality of second fields included in the first indication information may respectively indicate a plurality of second time intervals corresponding to a plurality of retransmissions. This avoids a case in which in a flexible and variable frame structure of NR, a PUCCH resource cannot be determined because only one time interval is indicated.

In some implementations of the first aspect or the second aspect, that the second indication information is used to indicate a frequency domain resource on which the first terminal apparatus sends the HARQ information to the network device includes:

The second indication information is used to indicate a physical uplink control channel PUCCH resource on which the first terminal apparatus sends the HARQ information to the network device, and the PUCCH resource satisfies one of the following conditions:

the PUCCH resource belongs to a first PUCCH resource pool, and the PUCCH resource pool is used to feed back the sidelink HARQ information and downlink HARQ information; or the PUCCH resource belongs to a first subset of the first PUCCH resource pool, the first PUCCH resource pool includes the first subset and a second subset, and the second subset is used to feed back the downlink HARQ information; or the PUCCH resource belongs to a second PUCCH resource pool, and there is no intersection between the second PUCCH resource pool and the first PUCCH resource pool.

The above are three manners in which a sidelink PUCCH resource is configured.

In the first manner, an existing mechanism of a downlink PUCCH resource pool of NR Uu may be reused, to avoid introducing extra design complexity.

In the second manner, a downlink PUCCH resource and the sidelink PUCCH resource may be divided based on the existing mechanism of the downlink PUCCH resource pool of NR Uu, to avoid the sidelink PUCCH resource overlapped with the downlink PUCCH resource.

In the third manner, an independent sidelink PUCCH resource pool is obtained through division, so that sufficient sidelink PUCCH resources can be provided, to avoid the sidelink PUCCH resource overlapped with the downlink PUCCH resource.

In some implementations of the first aspect or the second aspect, that the second indication information is used to indicate a physical uplink control channel PUCCH resource on which the first terminal apparatus sends the HARQ information to the network device includes:

The second indication information includes a third field or a fourth field, the third field is used to indicate one first PUCCH resource, and the fourth field is used to indicate one second PUCCH resource, where the first PUCCH resource is used by the first terminal apparatus to send the first HARQ information to the network device, and the first HARQ information is the feedback information for the PSCCH on which the initial transmission is performed and/or the PSSCH on which the initial transmission is performed; and the second PUCCH resource is used by the first terminal apparatus to send the second HARQ information to the network device, and the second HARQ information is the feedback information for the PSCCH on which the retransmission is performed and/or the PSSCH on which the retransmission is performed.

In this embodiment, the third field or the fourth field included in the second indication information may provide, for a terminal apparatus, the frequency domain resource on which the sidelink HARQ information is sent to the network device, and the network device may further adaptively adjust a sidelink modulation order, a sidelink code rate, or the like by using the sidelink HARQ information, thereby improving sidelink communication quality.

In addition, the third field or the fourth field included in the second indication information may provide, for the terminal apparatus, the frequency domain resource on which the sidelink HARQ information is sent to the network device. The network device may further adaptively adjust the sidelink modulation order, the sidelink code rate, or the like by using the sidelink HARQ information, thereby improving the sidelink communication quality.

In some implementations of the first aspect or the second aspect, that the second indication information is used to indicate a physical uplink control channel PUCCH resource on which the first terminal apparatus sends the HARQ information to the network device includes:

The second indication information includes a third field and one or more fourth fields, the third field is used to indicate one first PUCCH resource, and the fourth field is used to indicate one second PUCCH resource, where the first PUCCH resource is used by the first terminal apparatus to send the first HARQ information to the network device, and the first HARQ information is the feedback information for the PSCCH on which the initial transmission is performed and/or the PSSCH on which the initial transmission is performed; and the second PUCCH resource is used by the first terminal apparatus to send the second HARQ information to the network device, and the second HARQ information is the feedback information for the PSCCH on which the retransmission is performed and/or the PSSCH on which the retransmission is performed.

In this embodiment, the third field and the one or more fourth fields included in the second indication information may respectively indicate the first PUCCH resource corresponding to an initial transmission and the one or more second PUCCH resources corresponding to one or more retransmissions. This avoids a case in which in a flexible and variable resource configuration of NR, a PUCCH resource cannot be determined because only one frequency domain resource is indicated.

In addition, the third field and the one or more fourth fields included in the second indication information may respectively indicate the first PUCCH resource corresponding to the initial transmission and the one or more second PUCCH resources corresponding to the one or more retransmissions. This avoids a case in which during the initial transmission and the one or more retransmissions, when a requirement for overlapping a PUCCH resource changes, the terminal device cannot flexibly perform proper overlapping of a plurality of pieces of sidelink HARQ information, or a plurality of pieces of sidelink HARQ information and downlink HARQ information because only one PUCCH resource is indicated.

In some implementations of the first aspect or the second aspect, that the second indication information is used to indicate a PUCCH resource on which the first terminal apparatus sends the HARQ information to the network device includes:

The second indication information includes a plurality of fourth fields, and the plurality of fourth fields are used to indicate one or more second PUCCH resources, where the second PUCCH resource is used by the first terminal apparatus to send the second HARQ information to the network device, and the second HARQ information is the feedback information for the PSCCH on which the retransmission is performed and/or the PSSCH on which the retransmission is performed.

In this embodiment, the plurality of fourth fields included in the second indication information may respectively indicate a plurality of second PUCCH resources corresponding to a plurality of retransmissions. This avoids a case in which in a flexible and variable resource configuration of NR, a PUCCH resource cannot be determined because only one frequency domain resource is indicated.

In addition, the plurality of fourth fields included in the second indication information may respectively indicate the plurality of second PUCCH resources corresponding to the plurality of retransmissions. This avoids a case in which during the plurality of retransmissions, when a requirement for multiplexing a PUCCH resource changes, the terminal device cannot flexibly perform proper multiplexing of a plurality of pieces of sidelink HARQ information, or a plurality of pieces of sidelink HARQ information and downlink HARQ information because only one PUCCH resource is indicated.

In some implementations of the first aspect or the second aspect, the DCI further includes third indication information, the DCI further includes third indication information, the third indication information is used to indicate a third time interval, the third time interval is a time interval from a fifth time domain resource to a sixth time domain resource, the fifth time domain resource is a time domain resource on which the first terminal apparatus receives the DCI from the network device, and the sixth time domain resource is a time domain resource on which the first terminal apparatus sends the PSCCH and/or the PSSCH to the second terminal apparatus; and a processing unit 1200 is further configured to control, based on the third indication information, a transceiver unit 1100 to send the PSCCH and/or the PSSCH to the second terminal apparatus.

In this embodiment, scheduling of the DCI sent by the network device may provide, in the flexible and variable frame structure of NR, a resource configuration scheme for the transmit end apparatus in the sidelink communication to send the PSCCH and/or the PSSCH to the receive end apparatus.

Optionally, in an embodiment, that the third indication information is used to indicate a third time interval includes:

The third indication information is used to indicate a first time domain offset parameter, and the first time domain offset parameter and the third time interval satisfy the following formula:

$$\Delta = T_{DL} - N_{TA}/2 \cdot T_C + (k+m_k) \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, and $\mu$ is determined based on a subcarrier spacing of the first terminal apparatus.

Optionally, in an embodiment, that the third indication information is used to indicate a third time interval includes:

The third indication information is used to indicate a second time domain offset parameter, and the second time domain offset parameter and the time interval satisfy the following formula:

$$\Delta = T_{DL} - N_{TA}/2 \cdot T_C + K \cdot 10^{-3}/2^\mu, \text{where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, $\mu$ is determined based on a subcarrier spacing of the first terminal apparatus, and $K=k+m_k$.

Optionally, in an embodiment, the time domain resource after the third time interval is the $1^{st}$ available time domain resource in a sidelink time domain resource pool, and the time domain resource pool does not include a downlink time domain resource or a reserved time domain resource.

According to a third aspect, this application provides a method for configuring a sidelink transmission resource. The method includes: A first terminal apparatus receives DCI from a network device, where the DCI further includes third indication information, the third indication information is used to indicate a third time interval, the third time interval is a time interval from a fifth time domain resource to a sixth time domain resource, the fifth time domain resource is a time domain resource on which the first terminal apparatus receives the DCI from the network device, and the sixth time domain resource is a time domain resource on which the first terminal apparatus sends a PSCCH and/or a PSSCH to a second terminal apparatus; and the first terminal apparatus sends the PSCCH and/or the PSSCH to the second terminal apparatus based on the third indication information.

The network device sends the DCI to a transmit end apparatus in sidelink communication, so that in a flexible and variable frame structure of NR, the transmit end apparatus that schedules the sidelink communication may send the PSCCH and/or the PSSCH to a receive end apparatus. This may adapt to a plurality of complex scenarios of NR-V2X, for example, unicast and broadcast scenarios.

With reference to the third aspect, in some implementations of the third aspect, that the third indication information is used to indicate a third time interval includes: The third indication information is used to indicate a first time domain offset parameter, and the first time domain offset parameter and the third time interval satisfy the following formula:

$$\Delta = T_{DL} - N_{TA}/2 \cdot T_C + (k+m_k) \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, and $\mu$ is determined based on a subcarrier spacing of the first terminal apparatus; and that the first terminal apparatus sends the PSCCH and/or the PSSCH to the second terminal apparatus based on the third indication information includes:

the first terminal apparatus determines the third time interval according to the first time domain offset parameter and the formula; and the first terminal apparatus sends the PSCCH and/or the PSSCH to the second terminal apparatus on a time domain resource after the third time interval.

With reference to the third aspect, in some implementations of the third aspect, that the third indication information is used to indicate a third time interval includes: The third indication information is used to indicate a second time domain offset parameter, and the second time domain offset parameter and the time interval satisfy the following formula:

$$\Delta = T_{DL} - N_{TA}/2 \cdot T_C + K \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, $\mu$ determined based on a subcarrier spacing of the first terminal apparatus, and $K=k+m_k$; and that the first terminal apparatus sends the PSCCH and/or the PSSCH to the second terminal apparatus based on the third indication information includes:

the first terminal apparatus determines the third time interval according to the second time domain offset parameter and the formula; and the first terminal apparatus sends the PSCCH and/or the PSSCH to the second terminal apparatus on a time domain resource after the third time interval.

With reference to the third aspect, in some implementations of the third aspect, the time domain resource after the third time interval is the $1^{st}$ available time domain resource in a sidelink time domain resource pool, and the sidelink time domain resource pool does not include a downlink time domain resource or a reserved time domain resource.

According to a fourth aspect, this application provides a terminal apparatus. The terminal apparatus has a function of implementing the method according to any one of the first aspect or the embodiments of the first aspect, and/or the terminal apparatus has a function of implementing the method according to any one of the third aspect or the embodiments of the third aspect. The function may be implemented by hardware, or may be implemented by hardware executing corresponding software. The hardware or the software includes one or more units corresponding to the foregoing function.

According to a fifth aspect, this application provides a communications apparatus. The communications apparatus has a function of implementing the method according to any one of the second aspect or the embodiments of the second aspect. The function may be implemented by hardware, or may be implemented by hardware executing corresponding software. The hardware or the software includes one or more units corresponding to the foregoing function.

According to a sixth aspect, this application provides a terminal device. The terminal device includes a processor, a memory, and a transceiver. The memory is configured to store a computer program. The processor is configured to: invoke and run the computer program stored in the memory, and control the transceiver to send and receive a signal, so that the terminal device performs the method according to any one of the first aspect or the embodiments of the first aspect, and/or performs the method according to any one of the third aspect or the embodiments of the third aspect.

According to a seventh aspect, this application provides a network device. The network device includes a processor, a memory, and a transceiver. The memory is configured to store a computer program. The processor is configured to: invoke and run the computer program stored in the memory, and control the transceiver to send and receive a signal, so that the network device performs the method according to any one of the second aspect or the embodiments of the second aspect.

According to an eighth aspect, this application provides a computer-readable storage medium. The computer-readable storage medium stores a computer instruction, and when the computer instruction is run on a computer, the computer is enabled to perform the method according to any one of the first aspect or the embodiments of the first aspect, or perform the method according to any one of the third aspect or the embodiments of the third aspect.

According to a ninth aspect, this application provides a computer-readable storage medium. The computer-readable storage medium stores a computer instruction, and when the computer instruction is run on a computer, the computer is enabled to perform the method according to any one of the second aspect or the embodiments of the second aspect.

According to a tenth aspect, this application provides a computer program product. The computer program product includes computer program code, and when the computer program code is run on a computer, the computer is enabled to perform the method according to any one of the first aspect or the embodiments of the first aspect, or perform the method according to any one of the third aspect or the embodiments of the third aspect.

According to an eleventh aspect, this application provides a computer program product. The computer program product includes computer program code, and when the computer program code is run on a computer, the computer is enabled to perform the method according to any one of the second aspect or the embodiments of the second aspect.

According to a twelfth aspect, this application provides a communications apparatus. The communications apparatus includes a processor. The processor is configured to read and execute a computer program stored in a memory, to perform the method according to any one of the first aspect or the embodiments of the first aspect, or perform the method according to any one of the third aspect or the embodiments of the third aspect.

For example, the communications apparatus may be a chip or a chip system.

Optionally, the chip further includes the memory, and the memory and the processor are connected to the memory through a circuit or a wire. The memory may store a computer program or an instruction necessary for implementing the method according to the first aspect and/or the third aspect.

Further, optionally, the chip further includes a communications interface.

According to a thirteenth aspect, this application provides a communications apparatus. The communications apparatus includes a processor. The processor is configured to read and execute a computer program stored in a memory, to perform the method according to any one of the second aspect or the embodiments of the second aspect.

For example, the communications apparatus may be a chip or a chip system.

Optionally, the chip further includes the memory, and the memory and the processor are connected to the memory through a circuit or a wire. The memory may store a computer program or an instruction necessary for implementing the method according to the second aspect.

Further, optionally, the chip further includes a communications interface.

The chip system in the foregoing aspect may be a system on chip (SOC), a baseband chip, or the like. The baseband chip may include a processor, a channel encoder, a digital signal processor, a modem, an interface module, and the like.

According to a fourteenth aspect, this application provides a communications system. The communications system includes the terminal device according to the sixth aspect and the network device according to the seventh aspect.

DESCRIPTION OF EMBODIMENTS

The following describes technical solutions of this application with reference to the accompanying drawings.

The technical solutions in this application may be used in fields such as internet of vehicles (V2X), device-to-device (D2D), intelligent vehicle, intelligent connected vehicle, self-driving, intelligent transportation system, and assisted driving.

Figure 1:
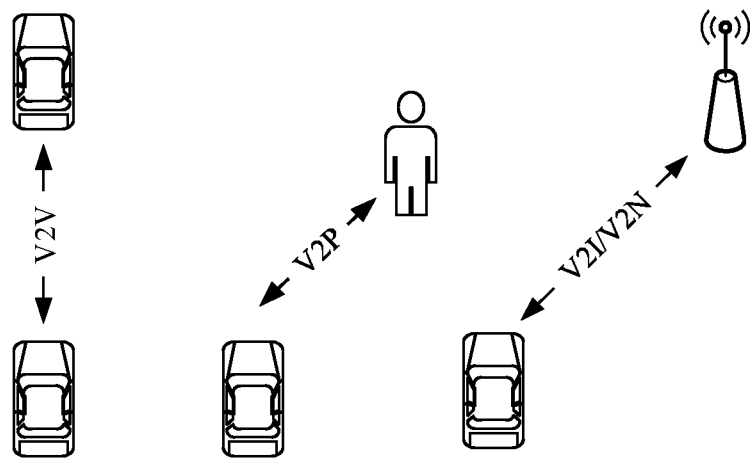
FIG. 1 is a diagram of V2X communication.

FIG. 1 is a diagram of V2X communication. In V2X communication, a link between vehicle-user equipment (V-UE) and vehicle-user equipment, between pedestrian-user equipment and vehicle-user equipment, or between roadside unit (RSU) devices is referred to as a sidelink (SL).

A link between vehicle-user equipment and a network device is referred to as a downlink (DL) or an uplink (UL), and an air interface of the link is also referred to as a Uu air interface. Correspondingly, DL communication and UL communication are also referred to as Uu communication.

For air interface transmission between a terrestrial radio access network and user equipment (UTRAN-to-UE, Uu), two ends in wireless communication are a network device and a terminal device. For SL air interface transmission, two ends in wireless communication are terminal devices.

The network device mentioned in this application may be an evolved NodeB (eNB) in a conventional universal mobile telecommunications system (universal mobile telecommunications system) or an LTE wireless communications system, or may be a micro base station in a heterogeneous network (HetNet). In a distributed base station scenario, the network device may be a baseband unit (BBU) and a remote radio unit (RRU). In a cloud radio access network (CRAN) scenario, the network device may be a baseband unit pool (BBU pool) and an RRU. In NR, the network device may be a gNB.

The terminal apparatus mentioned in this application includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN.

The terminal apparatus may include a wireless terminal device, a mobile terminal device, a device-to-device communication (D2D) terminal device, a V2X terminal device, a machine-to-machine (M2M) terminal device, machine-type communications (MTC) terminal device, an internet of things (IoT) terminal device, a subscriber unit, a subscriber station, a mobile station, a remote station, an access point (AP), a remote terminal, an access terminal, a user terminal, a user agent, a user device, or the like.

For example, the terminal apparatus may include a mobile phone (or referred to as a "cellular" phone), a computer having a mobile terminal device, a portable, pocket-sized, handheld, or computer built-in mobile apparatus, or the like. For example, the terminal apparatus may be a device such as a personal communication service (PCS) phone, a cordless telephone set, a session initiation protocol (SIP) phone, a wireless local loop (WLL) station, or a personal digital assistant (PDA). The terminal apparatus further includes a limited device, for example, a device with relatively low power consumption, a device with a limited storage capability, or a device with a limited computing capability. For example, the terminal apparatus may be an information sensing device, for example, a barcode, radio frequency identification (RFID), a sensor, a global positioning system (GPS), or a laser scanner.

In addition, the various terminal devices described above may alternatively be in-vehicle communications modules or other embedded communications modules, for example, vehicle user equipments (VUE). If the terminal apparatus is located on a vehicle, for example, placed in the vehicle or installed in the vehicle, the terminal apparatus may be considered as an in-vehicle terminal device. The in-vehicle terminal device may also be referred to as an on-board unit (OBU).

In addition, the terminal apparatus may alternatively be a vehicle-mounted module, a vehicle-mounted assembly, a vehicle-mounted component, a vehicle-mounted chip, or an on-board unit that is built in a vehicle as one or more components or units. The vehicle uses the vehicle-mounted module, the vehicle-mounted assembly, the vehicle-mounted component, the vehicle-mounted chip, or the on-board unit that is built in the vehicle, to implement the method in this application.

The following describes in detail the technical solutions provided in this application.

First, a complete procedure in which the terminal apparatus feeds back sidelink HARQ information to the network device in NR-V2X is described.

Figure 2:
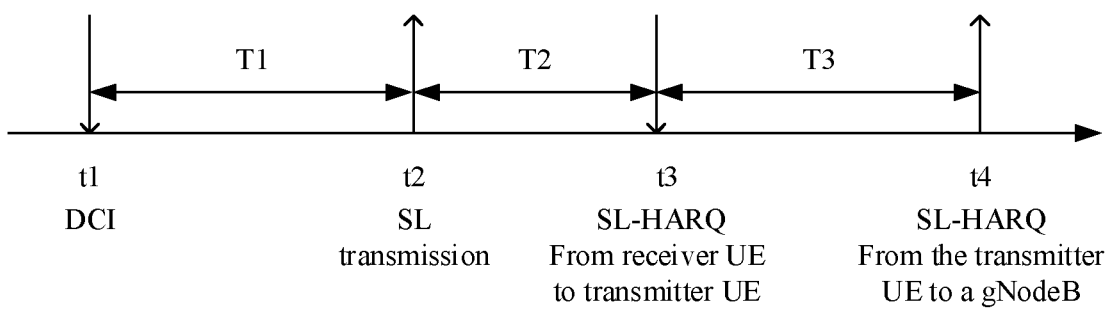
FIG. 2 is a timing sequence diagram in which a terminal apparatus feeds back sidelink HARQ information to a network device.

FIG. 2 is a timing sequence diagram in which a terminal apparatus feeds back sidelink HARQ information to a network device. As shown in FIG. 2, meanings of moments and time intervals are as follows:

a moment t1: at which transmitter UE receives DCI from the network device, and decodes the DCI;

a moment t2: at which the transmitter UE transmits a PSSCH and/or a PSCCH to the receiver UE;

a moment t3: at which the receiver UE feeds back the sidelink HARQ information to the transmitter UE;

a moment t4: at which the transmitter UE feeds back the sidelink HARQ information to a base station;

a time interval T1: from a moment at which the transmitter UE receives the DCI from the network device to a moment at which the transmitter UE sends the PSCCH and/or the PSSCH to the receiver UE;

a time interval T2: from a moment at which the receiver UE receives the PSCCH and/or the PSSCH from the transmitter UE to a moment at which the receiver UE sends the sidelink HARQ information to the transmitter UE; and a time interval T3: from a moment at which the transmitter UE receives the sidelink HARQ information from the receiver UE to a moment at which the transmitter UE feeds back the HARQ information to the network device.

In the timing sequence diagram shown in FIG. 2, the time interval T2 may be autonomously determined by the receiver UE based on a related parameter, and does not need to be scheduled by the network device.

However, in LTE-V2X, a HARQ feedback-based retransmission mechanism is not supported. Therefore, the DCI delivered by the network device to the UE does not include a configuration of a time domain resource and a frequency domain resource that are used by the UE to feed back the sidelink HARQ information to the network device.

In addition, in comparison with LTE, a frame structure of NR is more flexible, and data transmission is performed in a unit of a slot or a symbol. A length of a system frame is 10 milliseconds (ms), and a length of a subframe is 1 ms. Subframe numbers in one system frame are 0 to 9. A mapping relationship between a slot in each subframe and a subcarrier spacing (SCS) is listed in Table 1.

TABLE 1

| SCS | Quantity of symbols | Quantity of slots/subframes | Quantity of slots/system frames |
|---|---|---|---|
| Slot configuration (normal CP) | | | |
| 15 | 14 | 1 | 10 |
| 30 | 14 | 2 | 20 |
| 60 | 14 | 4 | 40 |

TABLE 1-continued

| SCS | Quantity of symbols | Quantity of slots/subframes | Quantity of slots/system frames |
|---|---|---|---|
| 120 | 14 | 8 | 80 |
| 240 | 14 | 16 | 160 |
| 480 | 14 | 32 | 320 |
| Slot configuration (extended CP) | | | |
| 60 | 12 | 4 | 40 |

Therefore, the time interval T1 shown in FIG. 2 needs to be designed to adapt to the frame structure of NR.

In addition, because only a feedback of the downlink HARQ information is considered in a configuration scheme of a frequency domain resource on which downlink HARQ information is fed back in NR, when a requirement for feeding back the sidelink HARQ information is introduced, a configuration scheme of the frequency domain resource of the sidelink HARQ information needs to be considered.

In view of the foregoing problem, in this application, a configuration scheme of the time interval T1 and the time interval T3 shown in FIG. 2 is provided for the feedback mechanism of the sidelink HARQ information introduced in NR-V2X.

In other words, this application provides the configuration scheme of the time domain resource and the frequency domain resource on which the terminal apparatus feeds back the sidelink HARQ information to the network device in an NR-V2X scenario and a configuration scheme of the time domain resource on which sidelink transmission is performed between terminal apparatuses in sidelink communication. The following separately provides detailed descriptions.

For ease of description, a transmit end device of data on a sidelink is referred to as a first terminal apparatus, and a receive end of the data is referred to as a second terminal apparatus below.

The first terminal apparatus and the second terminal apparatus may be terminal devices, or may be combined devices, components, or the like, of the terminal devices, that can implement the following method functions, for example, baseband chips.

It should be understood that numbers "first" and "second" in this specification are merely used to distinguish between different described objects, for example, to distinguish between different terminal apparatuses, time intervals, or the like, and do not mean a sequence of time or priorities.

Solution 1

The configuration scheme of the time domain resource and the frequency domain resource that are used by the terminal apparatus to feed back the sidelink HARQ information to the network device is as follows.

Figure 3:
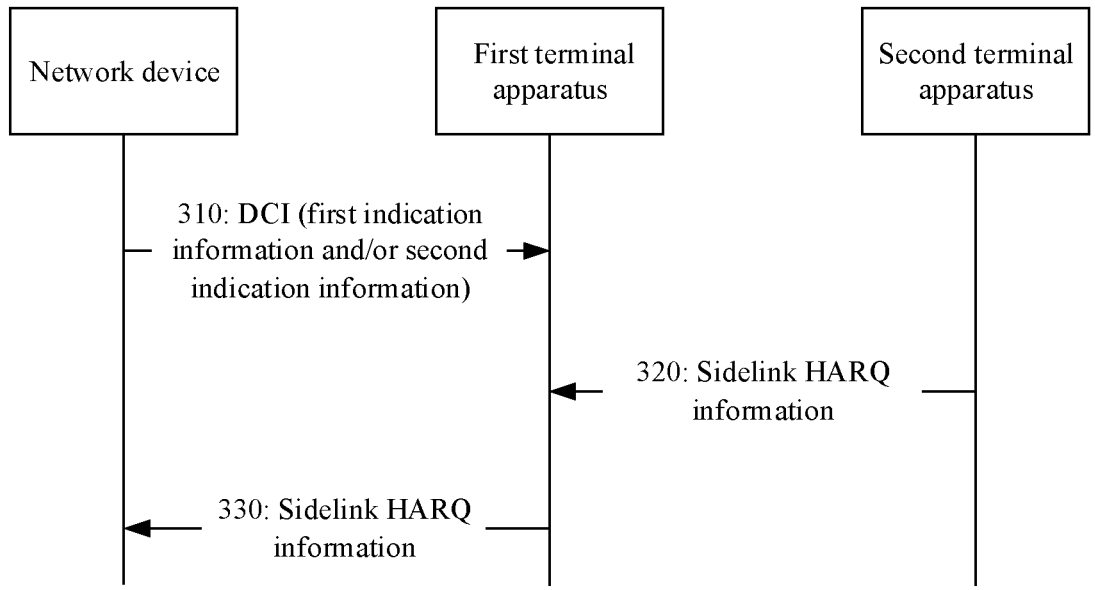
FIG. 3 is a flowchart of a method for configuring a sidelink transmission resource according to this application.

FIG. 3 is a flowchart of a method for configuring a sidelink transmission resource according to this application.

310: A network device sends DCI to a first terminal apparatus, where the DCI includes first indication information and/or second indication information.

The first indication information is used to indicate a time domain resource on which the first terminal apparatus sends HARQ information to the network device. The second indication information is used to indicate a frequency domain resource on which the first terminal apparatus sends the HARQ information to a network.

It should be understood that the first indication information and the second indication information respectively indicate the time domain resource and the frequency domain resource that are on which the first terminal apparatus sends sidelink HARQ information to the network device.

In this application, the DCI is used to indicate a configuration scheme of a sidelink transmission resource, and the solution may include two designs. Details of the two designs are separately described below.

In one design, the DCI is used to indicate a configuration of a feedback resource of the sidelink HARQ information for only one transmission.

The DCI received by the first terminal apparatus from the network device is used to schedule one sidelink transmission for a transport block (TB). The one sidelink transmission may be an initial transmission or a retransmission performed on a PSCCH and/or a PSSCH.

In another design, the DCI may indicate a configuration of a feedback resource of the sidelink HARQ information for a plurality of transmissions.

Optionally, the DCI received by the first terminal apparatus from the network device is used to schedule a plurality of transmissions for a TB. The plurality of transmissions may be one initial transmission scheduling and one or more retransmissions performed on the PSCCH and/or the PSSCH. Alternatively, the plurality of transmissions are all retransmissions performed on the PSCCH and/or the PSSCH.

The following separately describes the several implementations in detail in terms of time domain and frequency domain.

(1) Time Domain

In an embodiment, the first indication information is used to indicate a time interval from the time domain resource on which the first terminal apparatus receives the HARQ information sent by a second terminal apparatus for the PSCCH on which the initial transmission is performed and/or the PSSCH on which the initial transmission is performed to the time domain resource on which the first terminal apparatus sends the HARQ information to the network device for the PSCCH on which the initial transmission is performed and/or the PSSCH on which the initial transmission is performed.

In another embodiment, the first indication information is used to indicate a time interval from the time domain resource on which the first terminal apparatus receives the HARQ information sent by the second terminal apparatus for the PSCCH on which the retransmission is performed and/or the PSSCH on which the retransmission is performed to the time domain resource on which the first terminal apparatus sends the HARQ information to the network device for the PSCCH on which the retransmission is performed and/or the PSSCH on which the retransmission is performed.

For ease of description, the HARQ information for the PSCCH on which the initial transmission is performed and/or the PSSCH on which the initial transmission is performed is referred to as first HARQ information, and the HARQ information for the PSCCH on which the retransmission is performed and/or the PSSCH on which the retransmission is performed is referred to as second HARQ information below.

Further, a time interval from the time domain resource on which the first terminal apparatus receives the first HARQ information sent by the second terminal apparatus to the time domain resource on which the first terminal apparatus sends the first HARQ information to the network device is referred to as a first time interval.

A time interval from the time domain resource on which the first terminal apparatus receives the second HARQ information sent by the second terminal apparatus to the time domain resource on which the first terminal apparatus sends the second HARQ information to the network device is referred to as a second time interval.

In an implementation, the first indication information includes one first field or one second field. The first field is used to indicate the first time interval. The second field is used to indicate the second time interval.

It should be noted that, when the first field included in the first indication information is used to indicate one first time interval, or the second field included in the first indication information is used to indicate one second time interval, it indicates that one piece of DCI is used to indicate a feedback configuration of the sidelink HARQ information for only one transmission each time. Therefore, the one transmission may be the initial transmission or the retransmission. In this implementation, for the initial transmission or any one retransmission on a sidelink, a feedback of the HARQ information is scheduled by using only one piece of DCI.

In this implementation, a correspondence between the first field and the first time interval may be listed in Table 2-1 to Table 2-3. In Table 2-3, the first field indicates an index in an index set indicated by a higher layer configuration parameter (for example, sl-DataToUL-ACK), and the index corresponds to the first time interval.

TABLE 2-1

| First field | First time interval |
| --- | --- |
| 000 | 0 |
| 001 | 1 |
| 010 | 2 |
| 011 | 3 |
| 100 | 4 |
| 101 | 5 |
| 110 | 6 |
| 111 | 7 |

TABLE 2-2

| First field | First time interval |
| --- | --- |
| 000 | 1 |
| 001 | 2 |
| 010 | 3 |
| 011 | 4 |
| 100 | 5 |
| 101 | 6 |
| 110 | 7 |
| 111 | 8 |

TABLE 2-3

| First field | | | First time interval |
| --- | --- | --- | --- |
| 1 bit | 2 bits | 3 bits | |
| 0 | 00 | 000 | $1^{st}$ value in the higher layer parameter sl-DataToUL-ACK set |
| 1 | 01 | 001 | $2^{nd}$ value in the higher layer parameter sl-DataToUL-ACK set |
|   | 10 | 010 | $3^{rd}$ value in the higher layer parameter sl-DataToUL-ACK set |
|   | 11 | 011 | $4^{th}$ value in the higher layer parameter sl-DataToUL-ACK set |

TABLE 2-3-continued

| First field | | | First time interval |
| --- | --- | --- | --- |
| 1 bit | 2 bits | 3 bits | |
|   |   | 100 | $5^{th}$ value in the higher layer parameter sl-DataToUL-ACK set |
|   |   | 101 | $6^{th}$ value in the higher layer parameter sl-DataToUL-ACK set |
|   |   | 110 | $7^{th}$ value in the higher layer parameter sl-DataToUL-ACK set |
|   |   | 111 | $8^{th}$ value in the higher layer parameter sl-DataToUL-ACK set |

In an implementation, the first indication information includes one first field and one or more second fields. The first field is used to indicate one first time interval, and the one or more second fields are used to indicate one or more second time intervals.

In addition, in this embodiment of this application, units of time intervals in all tables may be slots or symbols, or may be subframes, subframes, or the like. This is not limited in this specification.

Optionally, each second field may indicate one second time interval. In other words, the second field and the second time interval are in a one-to-one mapping relationship.

Herein, for example, the second fields indicate two second time intervals. Mapping relationships between the first field and the first time interval, and between a plurality of second fields and a plurality of second time intervals are listed in Table 2-4.

It should be noted that the correspondences between the first field and the first time interval, and between the plurality of second fields and the plurality of second time intervals in Table 2-4 may also be listed in Table 2-3, that is, may be indicated by using the indexes in the higher layer parameter sl-DataToUL-ACK index set.

TABLE 2-4

| First field | First time interval | $1^{st}$ second field | Second time interval corresponding to the $1^{st}$ retransmission | $2^{nd}$ second field | Second time interval corresponding to the $2^{nd}$ retransmission |
| --- | --- | --- | --- | --- | --- |
| 000 | 0 | 000 | 0 | 000 | 0 |
| 001 | 1 | 001 | 1 | 001 | 1 |
| 010 | 2 | 010 | 2 | 010 | 2 |
| 011 | 3 | 011 | 3 | 011 | 3 |
| 100 | 4 | 100 | 4 | 100 | 4 |
| 101 | 5 | 101 | 5 | 101 | 5 |
| 110 | 6 | 110 | 6 | 110 | 6 |
| 111 | 7 | 111 | 7 | 111 | 7 |

Optionally, the first indication information may include a first field and one second field.

In an implementation, the one second field is used to indicate a plurality of second time intervals, and each second time interval corresponds to one retransmission on the sidelink. In other words, the second field and the second time intervals may be in a one-to-many mapping relationship.

Herein, for example, the second field indicates two second time intervals. Mapping relationships between the first field and the first time interval, and between the second field and the plurality of second time intervals may be listed in Table 2-5.

TABLE 2-5

| First field | First time interval | Second field | Second time interval corresponding to the 1st retransmission and second time interval corresponding to the 2nd retransmission |
|---|---|---|---|
| 000 | 0 | 000 | 0 |
| 001 | 1 | 001 | 1 |
| 010 | 2 | 010 | 2 |
| 011 | 3 | 011 | 3 |
| 100 | 4 | 100 | 4 |
| 101 | 5 | 101 | 5 |
| 110 | 6 | 110 | 6 |
| 111 | 7 | 111 | 7 |

Optionally, the mapping relationships between the first field and the first time interval, and between the second field and the plurality of second time intervals in Table 2-5 may also be listed in Table 2-3, that is, may be indicated by using the indexes in the higher layer parameter sl-DataToUL-ACK index set.

In another implementation, the first indication information includes the plurality of second fields, and the plurality of second fields are used to indicate the plurality of second time intervals.

It should be understood that when the first indication information indicates the plurality of second time intervals, each second time interval corresponds to a feedback of the HARQ information from the first terminal apparatus to the network device in one retransmission process. The retransmission refers to the retransmission performed on the PSCCH and/or the PSSCH.

(2) Frequency Domain

The second indication information in the DCI is used to indicate a PUCCH resource on which the first terminal apparatus sends the sidelink HARQ information to the network device.

Similar to the indication manner in time domain, the second indication information may be used to indicate one first PUCCH resource, or the second indication information may be used to indicate one second PUCCH resource, or the second indication information is used to indicate a plurality of second PUCCH resources, or the second indication information is used to indicate one PUCCH resource and one or more second PUCCH resources.

The first PUCCH resource is a frequency domain resource on which the first terminal apparatus sends the first HARQ information to the network device. The second PUCCH resource is a frequency domain resource on which the first terminal apparatus sends the second HARQ information to the network device.

The first PUCCH resource or the second PUCCH resource may be configured in a plurality of manners. The first PUCCH resource and the second PUCCH resource belong to a sidelink PUCCH resource pool.

Figure 4:
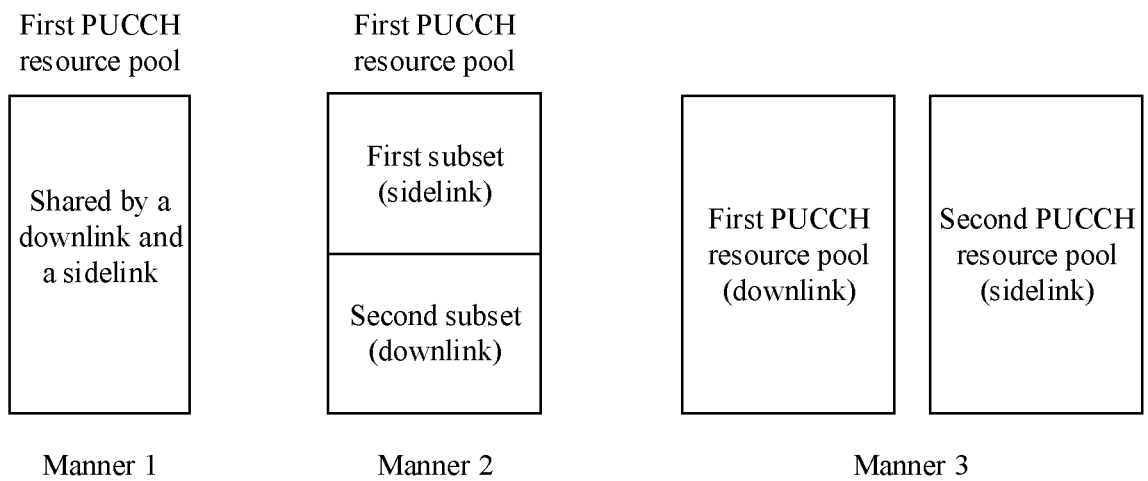
FIG. 4 is an example of a configuration scheme of a PUCCH resource on which sidelink HARQ information is fed back.

The following uses the first PUCCH resource as an example to describe configuration of a sidelink PUCCH resource with reference to FIG. 4.

FIG. 4 is an example of a configuration scheme of a PUCCH resource on which sidelink HARQ information is fed back.

Manner 1

A first PUCCH resource belongs to a first PUCCH resource pool, and the first PUCCH resource pool is a downlink PUCCH resource pool between a first terminal apparatus and a network device.

In other words, a sidelink and a downlink share one PUCCH resource. The PUCCH resource included in the first PUCCH resource pool is used to feed back downlink HARQ information and the sidelink HARQ information. The first PUCCH resource may be selected from the first PUCCH resource pool. For example, a mapping relationship between a PUCCH resource in the first PUCCH resource pool and a resource index may be listed in Table 3-1.

Each PUCCH resource in the first PUCCH resource pool corresponds to one PUCCH resource indicated by a PUCCH resource index set indicated by a higher layer parameter resource list.

TABLE 3-1

| PUCCH resource index set indicated by the resource list | PUCCH resource |
|---|---|
| 1st PUCCH resource index in the PUCCH resource index set indicated by the resource list | 1st PUCCH resource in the first PUCCH resource pool |
| 2nd PUCCH resource index in the PUCCH resource index set indicated by the resource list | 2nd PUCCH resource in the first PUCCH resource pool |
| 3rd PUCCH resource index in the PUCCH resource index set indicated by the resource list | 3rd PUCCH resource in the first PUCCH resource pool |
| 4th PUCCH resource index in the PUCCH resource index set indicated by the resource list | 4th PUCCH resource in the first PUCCH resource pool |
| 5th PUCCH resource index in the PUCCH resource index set indicated by the resource list | 5th PUCCH resource in the first PUCCH resource pool |
| 6th PUCCH resource index in the PUCCH resource index set indicated by the resource list | 6th PUCCH resource in the first PUCCH resource pool |
| 7th PUCCH resource index in the PUCCH resource index set indicated by the resource list | 7th PUCCH resource in the first PUCCH resource pool |
| 8th PUCCH resource index in the PUCCH resource index set indicated by the resource list | 8th PUCCH resource in the first PUCCH resource pool |

Manner 2

A first PUCCH resource belongs to a first subset of a first PUCCH resource pool, and the first PUCCH resource pool includes the first subset and a second subset. The first subset is used to send sidelink HARQ information, and the second subset is used to send downlink HARQ information.

In other words, NR downlink PUCCH resource pool is divided into two subsets, and the sidelink HARQ information and the downlink HARQ information each use one subset of the NR downlink PUCCH resource pool to send PUCCH resources.

A mapping relationship between the first PUCCH resource and a resource index may be the same as that in Manner 1, and details are not described herein again.

Manner 3

A first PUCCH resource belongs to a second PUCCH resource pool, there is no intersection between the second PUCCH resource pool and a first PUCCH resource pool, and the first PUCCH resource pool is used to send downlink HARQ information.

In other words, based on the PUCCH resource pool of the downlink HARQ information, an additional PUCCH resource pool is obtained through division to feed back sidelink HARQ information. A mapping relationship between a PUCCH resource in the second PUCCH resource pool and a resource index may be the same as that in Manner 1, and details are not described again.

Optionally, in another implementation, there may be an intersection between parts of the second PUCCH resource pool and the first PUCCH resource pool, and there is no intersection between the other parts.

Similar to first indication information, second indication information may also include a plurality of fields. The plurality of fields may include a third field and a fourth field. The third field is used to indicate the first PUCCH resource, and the fourth field is used to indicate a second PUCCH resource.

In an implementation, the second indication information includes only one third field, and the one third field is used to indicate one first PUCCH resource, or the second indication information includes only one fourth field, and the one fourth field is used to indicate one second PUCCH resource.

Herein, for example, the third field and the first PUCCH resource are used to describe a mapping relationship between the third field and the first PUCCH resource. A mapping relationship between the fourth field and the second PUCCH resource is also similar.

For example, the mapping relationship between the third field and the first PUCCH resource may be listed in Table 3-2.

TABLE 3-2

| Third field | First PUCCH resource |
|---|---|
| 000 | $1^{st}$ PUCCH resource indicated by a PUCCH resource index in a PUCCH resource index set indicated by a resource list |
| 001 | $2^{nd}$ PUCCH resource indicated by the PUCCH resource index in the PUCCH resource index set indicated by the resource list |
| 010 | $3^{rd}$ PUCCH resource indicated by the PUCCH resource index in the PUCCH resource index set indicated by the resource list |
| 011 | $4^{th}$ PUCCH resource indicated by the PUCCH resource index in the PUCCH resource index set indicated by the resource list |
| 100 | $5^{th}$ PUCCH resource indicated by the PUCCH resource index in the PUCCH resource index set indicated by the resource list |
| 101 | $6^{th}$ PUCCH resource indicated by the PUCCH resource index in the PUCCH resource index set indicated by the resource list |
| 110 | $7^{th}$ PUCCH resource indicated by the PUCCH resource index in the PUCCH resource index set indicated by the resource list |
| 111 | $8^{th}$ PUCCH resource indicated by the PUCCH resource index in the PUCCH resource index set indicated by the resource list |

In another implementation, the second indication information may include one third field and one or more fourth fields.

Optionally, each fourth field may indicate one second PUCCH resource. In other words, the fourth field and the second PUCCH resource may be in a one-to-one mapping relationship.

Herein, for example, the second indication information includes two fourth fields, and the two fourth fields indicate two second PUCCH resources. A correspondence between the third field and the first PUCCH resource, and a correspondence between a plurality of fourth fields and a plurality of second PUCCH resources are listed in Table 3-3.

TABLE 3-3

| Third field | First PUCCH resource | $1^{st}$ fourth field | Second PUCCH resource corresponding to the $1^{st}$ retransmission | $2^{nd}$ fourth field | Second PUCCH resource corresponding to the $2^{nd}$ retransmission |
|---|---|---|---|---|---|
| 000 | $1^{st}$ PUCCH resource indicated by a PUCCH resource index in a PUCCH resource index set indicated by a resource list | 000 | $1^{st}$ PUCCH resource indicated by the PUCCH resource index in the PUCCH resource index set indicated by the resource list | 000 | $1^{st}$ PUCCH resource indicated by the PUCCH resource index in the PUCCH resource index set indicated by the resource list |
| 001 | $2^{nd}$ PUCCH resource indicated by the PUCCH resource index in the PUCCH resource index set indicated by the resource list | 001 | $2^{nd}$ PUCCH resource indicated by the PUCCH resource index in the PUCCH resource index set indicated by the resource list | 001 | $2^{nd}$ PUCCH resource indicated by the PUCCH resource index in the PUCCH resource index set indicated by the resource list |
| 010 | $3^{rd}$ PUCCH resource indicated by the PUCCH resource index in the PUCCH resource index set indicated by the resource list | 010 | $3^{rd}$ PUCCH resource indicated by the PUCCH resource index in the PUCCH resource index set indicated by the resource list | 010 | $3^{rd}$ PUCCH resource indicated by the PUCCH resource index in the PUCCH resource index set indicated by the resource list |
| 011 | $4^{th}$ PUCCH resource indicated by the PUCCH resource index in the PUCCH resource index set indicated by the resource list | 011 | $4^{th}$ PUCCH resource indicated by the PUCCH resource index in the PUCCH resource index set indicated by the resource list | 011 | $4^{th}$ PUCCH resource indicated by the PUCCH resource index in the PUCCH resource index set indicated by the resource list |

TABLE 3-3-continued

| Third field | First PUCCH resource | 1$^{st}$ fourth field | Second PUCCH resource corresponding to the 1$^{st}$ retransmission | 2$^{nd}$ fourth field | Second PUCCH resource corresponding to the 2$^{nd}$ retransmission |
|---|---|---|---|---|---|
| 100 | 5$^{th}$ PUCCH resource indicated by the PUCCH resource index in the PUCCH resource index set indicated by the resource list | 100 | 5$^{th}$ PUCCH resource indicated by the PUCCH resource index in the PUCCH resource index set indicated by the resource list | 100 | 5$^{th}$ PUCCH resource indicated by the PUCCH resource index in the PUCCH resource index set indicated by the resource list |
| 101 | 6$^{th}$ PUCCH resource indicated by the PUCCH resource index in the PUCCH resource index set indicated by the resource list | 101 | 6$^{th}$ PUCCH resource indicated by the PUCCH resource index in the PUCCH resource index set indicated by the resource list | 101 | 6$^{th}$ PUCCH resource indicated by the PUCCH resource index in the PUCCH resource index set indicated by the resource list |
| 110 | 7$^{th}$ PUCCH resource indicated by the PUCCH resource index in the PUCCH resource index set indicated by the resource list | 110 | 7$^{th}$ PUCCH resource indicated by the PUCCH resource index in the PUCCH resource index set indicated by the resource list | 110 | 7$^{th}$ PUCCH resource indicated by the PUCCH resource index in the PUCCH resource index set indicated by the resource list |
| 111 | 8$^{th}$ PUCCH resource indicated by the PUCCH resource index in the PUCCH resource index set indicated by the resource list | 111 | 8$^{th}$ PUCCH resource indicated by the PUCCH resource index in the PUCCH resource index set indicated by the resource list | 111 | 8$^{th}$ PUCCH resource indicated by the PUCCH resource index in the PUCCH resource index set indicated by the resource list |

In Table 3-3, the 1$^{st}$ PUCCH resource to the 8$^{th}$ PUCCH resource that are indicated by the PUCCH resource indexes in the PUCCH resource index set indicated by the resource list may be respectively expressed as follows:

1$^{st}$ PUCCH resource provided by pucch-ResourceId obtained from the 1$^{st}$ value of resourcelist;

2$^{nd}$ PUCCH resource provided by pucch-ResourceId obtained from the 2$^{nd}$ value of resourcelist;

3$^{rd}$ PUCCH resource provided by pucch-ResourceId obtained from the 3$^{rd}$ value of resourcelist;

4$^{th}$ PUCCH resource provided by pucch-ResourceId obtained from the 4$^{th}$ value of resourcelist;

5$^{th}$ PUCCH resource provided by pucch-ResourceId obtained from the 5$^{th}$ value of resourcelist;

6$^{th}$ PUCCH resource provided by pucch-ResourceId obtained from the 6$^{th}$ value of resourcelist;

7$^{th}$ PUCCH resource provided by pucch-ResourceId obtained from the 7$^{th}$ value of resourcelist; and 8$^{th}$ PUCCH resource provided by pucch-ResourceId obtained from the 8$^{th}$ value of resourcelist.

Optionally, the one fourth field may be further used to indicate a plurality of second PUCCH resources. In other words, the fourth field and the second PUCCH resource may be in a one-to-many mapping relationship.

Herein, for example, the fourth field indicates two second PUCCH resources. A correspondence between the third field and the first PUCCH resource, and a correspondence between the fourth field and the plurality of second PUCCH resources are listed in Table 3-4.

TABLE 3-4

| Third field | First PUCCH resource | Fourth field | Second PUCCH resource corresponding to the 1$^{st}$ retransmission and the 2$^{nd}$ retransmission |
|---|---|---|---|
| 000 | 1$^{st}$ PUCCH resource indicated by a PUCCH resource index in a PUCCH resource index set indicated by a resource list | 000 | 1$^{st}$ PUCCH resource indicated by the PUCCH resource index in the PUCCH resource index set indicated by the resource list |
| 001 | 2$^{nd}$ PUCCH resource indicated by the PUCCH resource index in the PUCCH resource index set indicated by the resource list | 001 | 2$^{nd}$ PUCCH resource indicated by the PUCCH resource index in the PUCCH resource index set indicated by the resource list |
| 010 | 3$^{rd}$ PUCCH resource indicated by the PUCCH resource index in the PUCCH resource index set indicated by the resource list | 010 | 3$^{rd}$ PUCCH resource indicated by the PUCCH resource index in the PUCCH resource index set indicated by the resource list |
| 011 | 4$^{th}$ PUCCH resource indicated by the PUCCH resource index in the PUCCH resource index set indicated by the resource list | 011 | 4$^{th}$ PUCCH resource indicated by the PUCCH resource index in the PUCCH resource index set indicated by the resource list |

TABLE 3-4-continued

| Third field | First PUCCH resource | Fourth field | Second PUCCH resource corresponding to the 1$^{st}$ retransmission and the 2$^{nd}$ retransmission |
|---|---|---|---|
| 100 | 5$^{th}$ PUCCH resource indicated by the PUCCH resource index in the PUCCH resource index set indicated by the resource list | 100 | 5$^{th}$ PUCCH resource indicated by the PUCCH resource index in the PUCCH resource index set indicated by the resource list |
| 101 | 6$^{th}$ PUCCH resource indicated by the PUCCH resource index in the PUCCH resource index set indicated by the resource list | 101 | 6$^{th}$ PUCCH resource indicated by the PUCCH resource index in the PUCCH resource index set indicated by the resource list |
| 110 | 7$^{th}$ PUCCH resource indicated by the PUCCH resource index in the PUCCH resource index set indicated by the resource list | 110 | 7$^{th}$ PUCCH resource indicated by the PUCCH resource index in the PUCCH resource index set indicated by the resource list |
| 111 | 8$^{th}$ PUCCH resource indicated by the PUCCH resource index in the PUCCH resource index set indicated by the resource list | 111 | 8$^{th}$ PUCCH resource indicated by the PUCCH resource index in the PUCCH resource index set indicated by the resource list |

In still another implementation, the second indication information may include a plurality of fourth fields. The plurality of fourth fields are used to indicate a plurality of second PUCCH resources.

It should be understood that this specification is mainly for a feedback of the sidelink HARQ information. For brevity of description, unless otherwise specified, HARQ information in the following is the sidelink HARQ information.

As described above, the DCI may include only the first indication information, or include only the second indication information, or include both the first indication information and the second indication information.

When the DCI includes only the first indication information, it indicates that the network device indicates only the time domain resource on which the first terminal apparatus feeds back the sidelink HARQ information to the network device. In this case, the PUCCH resource on which the first terminal apparatus feeds back the HARQ information to the network device may be configured by the network device by using higher layer signaling. For example, the higher layer signaling may be radio resource control (RRC) signaling.

When the DCI includes only the second indication information, it indicates that a default value is used for the time interval (the first time interval or the second time interval) from the time resource on which the first terminal apparatus receives the HARQ information from the second terminal apparatus to the time resource on which the first terminal apparatus feeds back the HARQ information to the network device.

Optionally, the default value of the time interval may be 0. In other words, the time domain resource on which the first terminal apparatus receives the sidelink HARQ information from the second terminal apparatus is the time domain resource on which the first terminal apparatus sends the HARQ information to the network device.

Optionally, the DCI may include two fields: a PSFCH to HARQ feedback timing indicator and a PUCCH-SL resource indicator. The first indication information may be carried in the PSFCH to HARQ feedback timing indicator field, and the second indication information may be carried in the PUCCH-SL resource indicator field.

Optionally, in this application, a unit of the time interval may be a slot, a symbol, a frame, a subframe, or the like. This is applicable to the first time interval, the second time interval, and the third time interval in this specification.

The first terminal apparatus receives the DCI from the network device, and may learn of, based on the first indication information and/or the second indication information carried in the DCI, configuration of the time domain resource and the frequency domain resource that are on which the first terminal apparatus sends the HARQ information to the network device.

320: The first terminal apparatus receives the sidelink HARQ information from the second terminal apparatus.

After receiving the DCI from the network device, the first terminal apparatus sends the PSCCH and/or the PSCCH to the second terminal apparatus based on scheduling of the network device. The second terminal apparatus receives the PSCCH and/or the PSSCH from the first terminal apparatus, and sends the HARQ information to the first terminal apparatus depending on whether the PSCCH and/or the PSCCH are/is correctly received.

Correspondingly, the first terminal apparatus receives the sidelink HARQ information from the second terminal apparatus.

330: The first terminal apparatus sends the sidelink HARQ information to the network device based on the first indication information and/or the second indication information.

After receiving the sidelink HARQ information from the second terminal apparatus, the first terminal apparatus determines that the HARQ information is an ACK or a NACK. The first terminal apparatus feeds back the sidelink HARQ information to the network device based on a determining result.

From the first time domain resource on which the first terminal apparatus receives the sidelink HARQ information from the second terminal apparatus, the first terminal apparatus sends the sidelink HARQ information to the network device on the second time domain resource and the first PUCCH resource after the first time interval.

The foregoing describes the configuration scheme, provided in this application, of the transmission resource on which the first terminal apparatus sends the sidelink HARQ information to the network device. The following describes a configuration scheme of the transmission resource on which the first terminal apparatus sends the PSSCH and/or the PSSCH to the second terminal apparatus.

Solution 2

The configuration scheme of the time domain resource on which a transmit end apparatus in sidelink communication sends the PSCCH and/or the PSSCH to a receive end apparatus is as follows.

Figure 5:
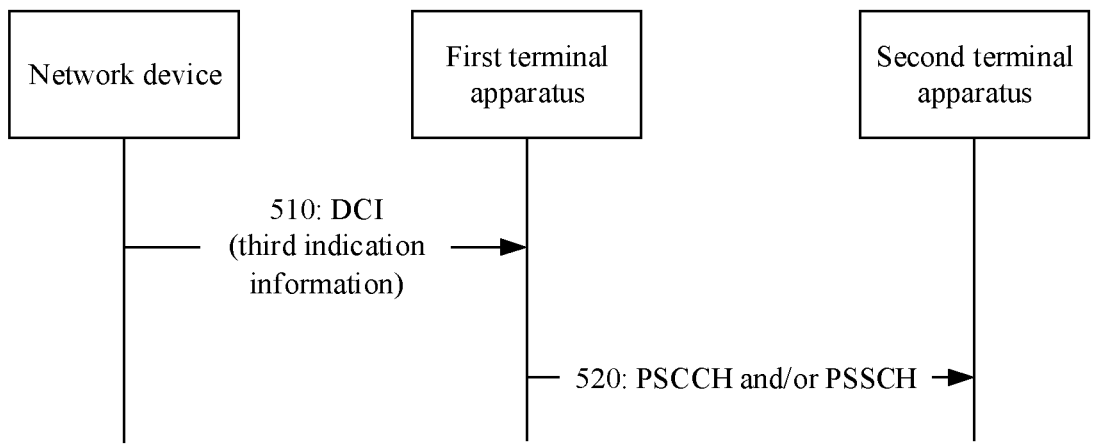
FIG. 5 is another flowchart of a method for configuring a sidelink transmission resource according to this application.

FIG. 5 is another flowchart of a method for configuring a sidelink transmission resource according to this application.

510: A network device sends DCI to a first terminal apparatus, where the DCI includes third indication information, and the third indication information is used to indicate a time domain resource on which the first terminal apparatus sends a PSCCH and/or a PSSCH to a second terminal apparatus.

Optionally, the third indication information is used to indicate a third time interval. The third time interval is a time interval from a fifth time domain resource to a sixth time domain resource.

The fifth time domain resource is a time domain resource on which the first terminal apparatus receives the DCI from the network device, and the sixth time domain resource is a time domain resource on which the first terminal apparatus sends the PSCCH and/or the PSSCH to the second terminal apparatus.

In an implementation, the third indication information may be carried in a sidelink index (SL index) field in the DCI.

Optionally, in an implementation, the third indication information is used to indicate a first time domain offset parameter, and the first time domain offset parameter is used to determine the third time interval.

The first time domain offset parameter and the third time interval satisfy formula (1):

$$\Delta = T_{DL} - N_A/2 \cdot T_S + (k+m_k) \cdot 10^{-3}/2^\mu \quad (1), \text{where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, and $\mu$ is determined based on a subcarrier spacing of the first terminal apparatus.

$N_{TA} = T_A \cdot 16 \cdot 64/2^\mu$, where $T_A$ represents a timing advance command (TAC). In an initial access phase, a value range of TA is $T_A = 0, 1, 2, \ldots, 3846$. In a non-initial access phase, a value of TA is configured by the network device.

$T_C = 1/(4 f_{max} \cdot N_f)$ represents a minimum time unit of NR, where $\Delta f_{max} = 480 \cdot 10^3$ Hz, and $N_f = 4096$.

k represents the time domain offset relative to $T_{DL}$, and may be configured by a higher layer parameter. For example, the network device may configure a value of k by using RRC signaling. For example, the value of k may be 0, 1, 2, 3, or 4. This is not limited herein.

$m_k$ represents the first time domain offset parameter, and a value of $m_k$ may be listed in Table 4-1 to Table 4-4. An SL index in Table 4-1 to Table 4-4 is one field in the DCI.

TABLE 4-1

| SL index | $m_k$ |
|---|---|
| 00 | 0 |
| 01 | 1 |
| 10 | 2 |
| 11 | 3 |

TABLE 4-2

| SL index | $m_k$ |
|---|---|
| 00 | 0 |
| 01 | 2 |
| 10 | 4 |
| 11 | 6 |

TABLE 4-3

| SL index | $m_k$ |
|---|---|
| 00 | 0 |
| 01 | 1 |
| 10 | 3 |
| 11 | 5 |

TABLE 4-4

| SL index | $m_k$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In addition, in formula (1), $\mu$ is determined based on a subcarrier spacing (SCS) of the first terminal apparatus. Refer to Table 4-5.

TABLE 4-5

| SCS (kHz) | $\mu$ |
|---|---|
| 15 | 0 |
| 30 | 1 |
| 60 | 2 |
| 120 | 3 |
| 240 | 4 |
| 480 | 5 |

Optionally, in another implementation, the third indication information is used to indicate a second time domain offset parameter, and the second time domain offset parameter is used to determine the third time interval.

The second time domain offset parameter and the third time interval satisfy formula (2):

$$\Delta = T_{DL} - N_{TA}/2 \cdot T_C + K \cdot 10^{-3}/2^\mu \quad (2), \text{where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, $\mu$ is determined based on a subcarrier spacing of the first terminal apparatus, and $K = k + m_k$.

520: The first terminal apparatus sends the PSCCH and/or the PSSCH to the second terminal apparatus based on the third indication information.

The first terminal apparatus may determine the third time interval based on the third indication information. From the time domain resource on which the network device receives the DCI, the first terminal apparatus sends the PSCCH and/or the PSSCH to the second terminal apparatus on a time domain resource of the 1$^{st}$ available sidelink after the third time interval.

Correspondingly, the second terminal apparatus receives the PSCCH and/or the PSSCH from the first terminal apparatus.

In another embodiment, the DCI sent by the network device to the first terminal apparatus does not carry the third indication information. In this case, the first terminal apparatus may use a default time interval.

Optionally, the default time interval may be 0. After receiving the DCI, the first terminal apparatus sends the PSCCH and/or the PSSCH to the second terminal apparatus on the 1st available time domain resource in a sidelink time domain resource pool after a $\Delta=T_{DL}-N_{T4}/2 \cdot T_C$ moment.

Optionally, the sidelink time domain resource pool may be represented as $\{t_0^{SL}, t_1^{SL}, \ldots, t_{T_{max}}^{SL}\}$. The sidelink time domain resource pool does not include the following time domain resources:

(1) a downlink time domain resource; and
(2) a reserved time domain resource.

In addition, time domain units in the time domain resource pool are sorted in ascending order.

Optionally, a time domain resource in the time domain resource pool may also be referred to as a time domain unit. The time domain unit may be a slot, a symbol, a subframe, a frame, or the like.

For example, when a unit of the time domain unit is defined as a slot, each time domain unit in the time domain resource pool satisfies $0<t_i^{SL}<10240 \cdot N_{slot}$, where $0 \leq t_i^{SL} \leq T_{max}$.

For another example, when the unit of the time domain unit is defined as a symbol, each time domain unit in the time domain resource pool satisfies $0<t_i^{SL}<10240 \cdot N_{slot} \times 14$.

10240 indicates a total quantity of subframes included in one system frame. $N_{slot}$ indicates a quantity of slots corresponding to each subframe in configurations of different subcarrier spacings.

The foregoing separately describes the configuration scheme of the transmission resource on which the first terminal apparatus sends the sidelink HARQ information to the network device and the configuration scheme of the transmission resource on which the first terminal apparatus sends the PSCCH and/or the PSSCH to the second terminal apparatus.

In an implementation, the solution 1 and the solution 2 may be used in combination. The following provides descriptions with reference to FIG. 6.

Figure 6:
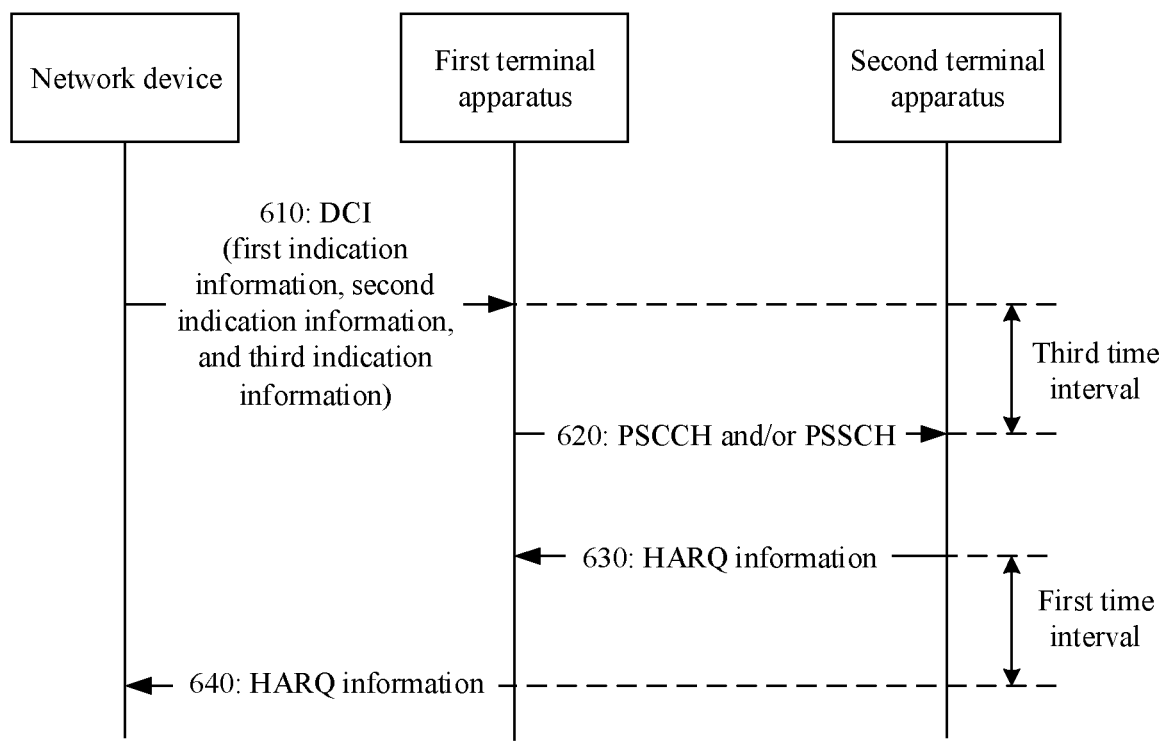
FIG. 6 is an example of a method for configuring a sidelink transmission resource according to this application.

FIG. 6 is an example of a method for configuring a sidelink transmission resource according to this application.

610: A network device sends DCI to a first terminal apparatus, where the DCI includes first indication information, second indication information, and third indication information.

A first field included in the first indication information is used to indicate a first time interval. The first time interval is a time interval from a first time domain resource to a second time domain resource. The first time domain resource is a time domain resource on which the first terminal apparatus receives first HARQ information from a second terminal apparatus. The second time domain resource is a time domain resource on which the first terminal apparatus sends the first HARQ information to the network device. The first HARQ information is feedback information for a PSCCH on which an initial transmission is performed and/or a PSSCH on which an initial transmission is performed.

A third field included in the second indication information is used to indicate a first PUCCH resource. The first PUCCH resource is a frequency domain resource on which the first terminal apparatus sends the first HARQ information to the network device.

The third indication information is used to indicate a third time interval. The third time interval is a time interval from a fifth time domain resource to a sixth time domain resource. The fifth time domain resource is a time domain resource on which the first terminal apparatus receives the DCI from the network device, and the sixth time domain resource is a time domain resource on which the first terminal apparatus sends the PSCCH and/or the PSSCH to the second terminal apparatus Correspondingly, the first terminal apparatus receives the DCI from the network device.

620: The first terminal apparatus sends, based on the third indication information, the PSCCH and/or the PSSCH to the second terminal apparatus on the 1st time domain resource that is available for sidelink transmission and that is after the third time interval.

It should be understood that the first terminal apparatus sending the PSCCH and/or the PSSCH to the second terminal apparatus includes the following embodiments.

(1) The first terminal apparatus sends the PSCCH to the second terminal apparatus.
(2) The first terminal apparatus sends the PSSCH to the second terminal apparatus.
(3) The first terminal apparatus sends the PSCCH and the PSSCH to the second terminal apparatus.

Correspondingly, the second terminal apparatus receives the PSCCH from the first terminal apparatus, or receives the PSSCH from the first terminal apparatus, or receives the PSCCH and the PSSCH from the first terminal apparatus.

630: The second terminal apparatus decodes the received PSCCH and/or PSSCH, and sends HARQ information to the first terminal apparatus based on a decoding result.

In the case (1) described in step 620, if the second terminal apparatus receives the PSCCH from the first terminal apparatus, the second terminal apparatus decodes the PSCCH, and sends the HARQ information to the first terminal apparatus based on the decoding result. If the second terminal apparatus successfully decodes the PSCCH, the second terminal apparatus sends an ACK to the first terminal apparatus. If the second terminal apparatus fails to decode the PSCCH, the second terminal apparatus sends a NACK to the first terminal apparatus.

As described in the case (2) in step 620, if the second terminal apparatus receives the PSSCH from the first terminal apparatus, the second terminal apparatus decodes the PSSCH. If the second terminal apparatus successfully decodes the PSSCH, the second terminal apparatus sends an ACK to the first terminal apparatus. If the second terminal apparatus fails to decode the PSSCH, the second terminal apparatus sends a NACK to the first terminal apparatus.

As described in the case (3) in step 620, if the second terminal apparatus receives the PSCCH and the PSSCH from the first terminal apparatus, the second terminal apparatus decodes the PSCCH and the PSSCH. If the second terminal apparatus successfully decodes the PSCCH and the PSSCH, the second terminal apparatus sends an ACK to the first terminal apparatus. If the second terminal apparatus fails to decode the PSCCH, or fails to decode both the PSCCH and the PSSCH, the second terminal apparatus sends a NACK to the first terminal apparatus.

The first terminal apparatus receives the HARQ information from a second terminal apparatus.

640: The first terminal apparatus sends, on the first PUCCH resource, the sidelink HARQ information to the network device based on the first indication information/or the second indication information in the DCI on a time domain resource corresponding to the first time interval.

As shown above, the first terminal apparatus may determine, based on the first indication information, the time domain resource on which the sidelink HARQ information is sent to the network device. The first terminal apparatus may determine, based on the second indication information, the frequency domain resource on which the sidelink HARQ information is sent to the network device. Therefore, the first terminal apparatus sends the sidelink HARQ information to the network device based on scheduling of the DCI.

The network device receives the sidelink HARQ information from the first terminal apparatus.

A procedure shown in FIG. 6 may be that the first terminal apparatus sends the HARQ information to the network device for the PSCCH on which the initial transmission is performed and/or the PSSCH on which the initial transmission is performed.

In another implementation described above, the first indication information and the second indication information may not only indicate the transmission resource for the first HARQ information of the PSCCH on which the initial transmission is performed and/or the PSSCH on which the initial transmission is performed, but also indicate a configuration of the transmission resource for the second HARQ information of a PSCCH on which one or more retransmissions are performed and/or a PSSCH on which one or more retransmissions are performed. The following provides an example for description with reference to FIG. 7.

Figure 7:
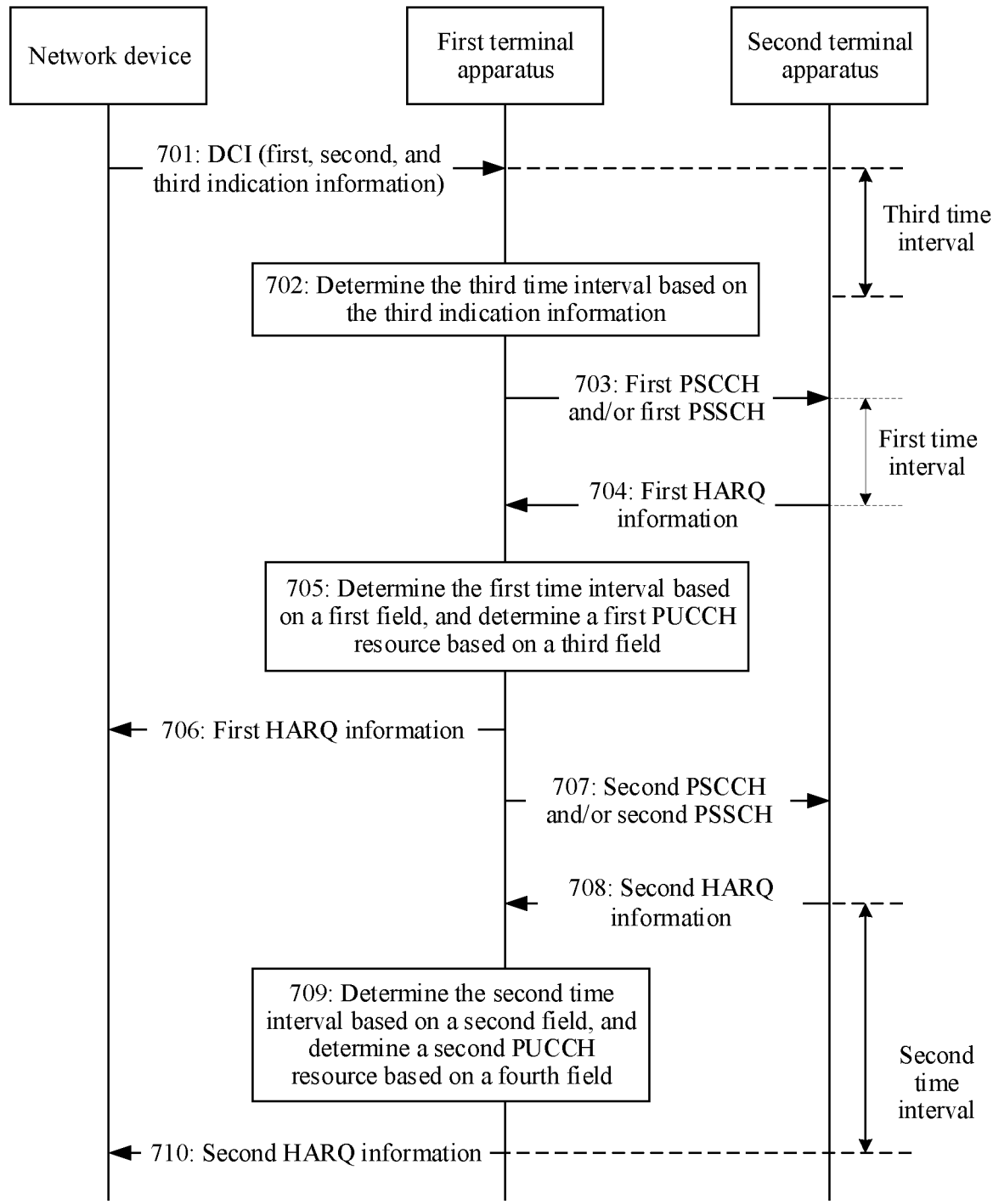
FIG. 7 is another example of a method for configuring a sidelink transmission resource according to this application.

FIG. 7 is another example of a method for configuring a sidelink transmission resource according to this application.

701: A network device sends DCI to a first terminal apparatus, where the DCI includes first indication information, second indication information, and third indication information.

The first indication information is used to indicate a first time interval and/or a second time interval. The second indication information is used to indicate a first PUCCH resource and/or a second PUCCH resource. The third indication information is used to indicate a third time interval.

For descriptions of the first time interval, the second time interval, the third time interval, the first PUCCH resource, and the second PUCCH resource, refer to the foregoing descriptions. Details are not described again.

In addition, for indication of the indication information, the time intervals, and a mapping relationship between the PUCCH resources, refer to the foregoing plurality of implementations. Details are not described herein again.

702: The first terminal apparatus determines, based on the third indication information, a sixth time domain resource on which a PSCCH and/or a PSSCH is sent to a second terminal apparatus.

The first terminal apparatus determines the third time interval based on the third indication information. Further, the first terminal apparatus determines, with reference to the third time interval and a fifth time domain resource on which the DCI is received from the network device, the sixth time domain resource on which the PSCCH and/or the PSSCH is sent to the second terminal apparatus.

703: The first terminal apparatus sends the PSCCH and/or the PSSCH to the second terminal apparatus on the sixth time domain resource.

The second terminal apparatus receives the PSCCH and/or the PSSCH from the first terminal apparatus.

704: The second terminal apparatus decodes the PSCCH and/or the PSSCH, and sends first HARQ information to the first terminal apparatus based on a decoding result.

The first terminal apparatus receives the first sidelink HARQ information from the second terminal apparatus.

705: The first terminal apparatus determines, based on a first field in the first indication information and a third field in the second indication information, a time domain resource and a frequency domain resource on which the first HARQ information is sent to the network device.

The first terminal apparatus determines that the received first HARQ information is an ACK or a NACK, and feeds back the ACK or the NACK to the network device based on the determining result.

In an implementation, if the first terminal apparatus determines that the first HARQ information is the NACK, it indicates that the second terminal apparatus fails to receive a first PSCCH and/or a first PSSCH. On one hand, the first terminal apparatus feeds back the first HARQ information to the network device, as described in step 706 in the following. On the other hand, the first terminal apparatus enters a retransmission process, as described in steps 707 to 710.

706: The first terminal apparatus sends the first HARQ information to the network device on a second time domain resource by using the first PUCCH resource.

In time domain, the first terminal apparatus determines the first time interval, and further determines, based on the first time interval and the first time domain resource on which the first HARQ information is received from the second terminal apparatus, the second time domain resource on which the first HARQ information is sent to the network device.

In frequency domain, the first terminal apparatus determines the first PUCCH resource on which the first HARQ information is sent to the network device.

After determining the time domain resource and the frequency domain resource on which the first HARQ information is fed back to the network device, the first terminal apparatus sends the first HARQ information to the network device by using the determined second time domain resource and first PUCCH resource.

Correspondingly, the network device receives the first HARQ information from the first terminal apparatus.

707: The first terminal apparatus sends a second PSCCH and/or a second PSSCH to the second terminal apparatus.

The second terminal apparatus receives the second PSCCH and/or the second PSSCH from the first terminal apparatus.

708: The second terminal apparatus decodes the second PSCCH and/or the second PSSCH, and sends second HARQ information to the first terminal apparatus based on a decoding result.

Correspondingly, the first terminal apparatus receives the second HARQ information from the second terminal apparatus.

The second HARQ information is feedback information for the second PSCCH and/or the second PSSCH.

709: The first terminal apparatus determines the second time interval based on a second field in the first indication information, and determines the second PUCCH resource based on a fourth field in the third indication information.

In time domain, the first terminal apparatus determines the second time interval, and determines, based on a third time domain resource on which the second HARQ information is received from the second terminal apparatus, a fourth time domain resource on which the second HARQ information is sent to the network device.

In frequency domain, the first terminal apparatus determines the second PUCCH resource on which the second HARQ information is sent to the network device.

710: The first terminal apparatus sends the second HARQ information to the network device on the fourth time domain resource by using the second PUCCH resource.

Correspondingly, the network device receives the second HARQ information from the first terminal apparatus.

It should be understood that one initial transmission and one retransmission are used as an example for description in FIG. 7. When there are a plurality of retransmissions, a person skilled in the art may learn, based on the $1^{st}$ retransmission procedure shown in 707 to 710, how to implement the plurality of retransmissions. Details are not described again.

In addition, in step 705, after receiving the first HARQ information from the second terminal apparatus, the first terminal apparatus determines that the first HARQ information is the ACK or the NACK, and sends the first HARQ information to the network device based on the determining result.

If the initial transmission fails, the first terminal apparatus performs the $1^{st}$ retransmission. After receiving the HARQ information (namely, the second HARQ information) for the $1^{st}$ retransmission from the second terminal apparatus, the second terminal apparatus determines that the second HARQ information is the ACK or the NACK, and sends the second HARQ information to the network device based on the determining result.

It should be noted that, in a feedback mechanism of the HARQ information for the initial transmission and the $1^{st}$ retransmission described in FIG. 7, the first terminal apparatus feeds back the HARQ information to the network device regardless of whether the result of the HARQ information for the initial transmission and the $1^{st}$ retransmission is the ACK or the NACK. This feedback mechanism is merely used as an example.

In another feedback mechanism of the sidelink HARQ information, after receiving the sidelink HARQ information from the second terminal apparatus, the first terminal apparatus parses the HARQ information. If the HARQ information is the NACK, the first terminal apparatus does not feed back the HARQ information to the network device. If the HARQ information is the ACK, the first terminal apparatus feeds back the HARQ information to the network device.

In an embodiment, if a quantity of retransmissions reaches an upper limit, but a retransmission still fails, the first terminal apparatus feeds back HARQ information for the last retransmission to the network device, regardless of whether the HARQ information for the last retransmission is the ACK or the NACK.

Figure 8:
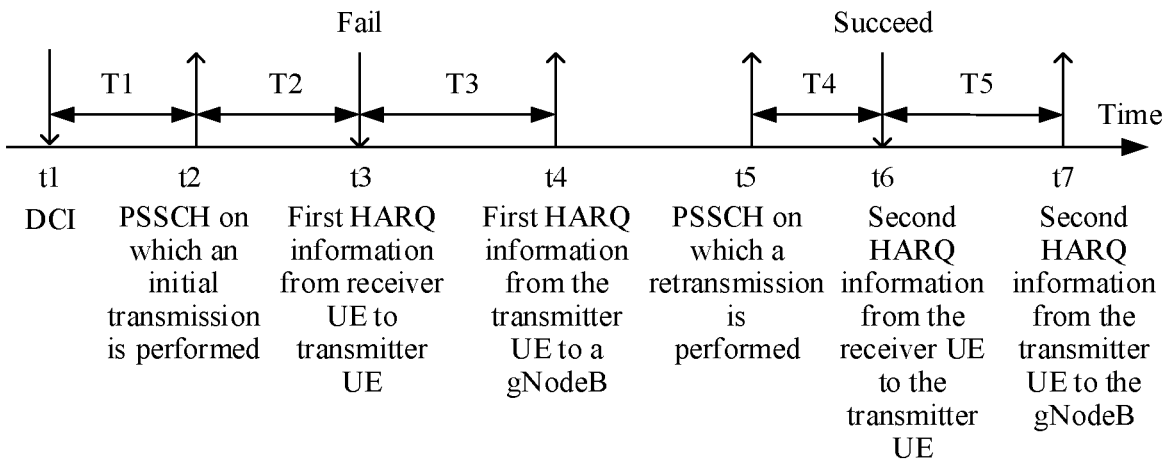
FIG. 8 is an example of a timing sequence diagram in which a terminal apparatus feeds back sidelink HARQ information to a network device.

In addition, the procedure shown in FIG. 7 may be understood with reference to a timing sequence diagram shown in FIG. 8.

FIG. 8 is an example of a timing sequence diagram in which a terminal apparatus feeds back sidelink HARQ information to a network device.

In a time unit corresponding to t1, a first terminal apparatus receives DCI from a network device. The first terminal apparatus determines a time interval T1 based on indication of third indication information in the DCI.

The first terminal apparatus sends a PSSCH to a second terminal apparatus in a time unit corresponding to t2, where t2=t1+T1.

The second terminal apparatus receives, in the time unit corresponding to t2, the PSSCH from the first terminal apparatus, and autonomously determines a time interval T2.

The second terminal apparatus sends first HARQ information to the first terminal apparatus in a time unit corresponding to t3, and the first HARQ information is used to indicate whether the second terminal apparatus successfully receives the PSSCH on which an initial transmission is performed. In the example in FIG. 8, it is assumed that the first HARQ information is a NACK.

The first terminal apparatus receives the first HARQ information from the second terminal apparatus in the time unit corresponding to t3.

The first terminal apparatus determines a time interval T3 based on a first field in first indication information.

The first terminal apparatus sends the first HARQ information to the network device in a time unit corresponding to t4, where t4=t3+T3.

The first terminal apparatus determines t5 based on a field carried in the DCI. t5 represents a corresponding time unit in which the first terminal apparatus retransmits the PSSCH to the second terminal apparatus. For the field that is carried in the DCI and that is used to determine the moment t5, refer to the prior art. Details are not described in this specification.

In the time unit corresponding to t5, the second terminal apparatus receives the retransmitted PSSCH from the first terminal apparatus. The second terminal apparatus autonomously determines a time interval T4.

The second terminal apparatus sends second HARQ information to the first terminal apparatus in a time unit corresponding to t6, where t6=t5+T4. The second HARQ information is used to indicate whether the second terminal apparatus successfully receives the retransmitted PSSCH.

The first terminal apparatus receives the second HARQ information from the second terminal apparatus in the time unit corresponding to t6.

The first terminal apparatus determines a time interval T5 based on one or more second fields in the first indication information.

The first terminal apparatus sends the second HARQ information to the network device in a time unit corresponding to t7, where t7=t6+T5.

It may be understood that the time interval T1 in FIG. 8 is used as an example of a third time interval. The time interval T3 is an example of a first time interval. The time interval T5 is an example of a second time interval.

The time domain unit in FIG. 7 may be in a unit of a slot, a symbol, a frame, a subframe, or the like. This is not limited herein.

In addition, FIG. 8 shows only a configuration in time domain. The first terminal apparatus further needs to separately determine, in the time unit corresponding to t4 and the time unit corresponding to t7, a first PUCCH resource on which the first HARQ information is sent to the network device and a second PUCCH resource on which the second HARQ information is sent to the network device. For a process, refer to the foregoing descriptions. Details are not described again.

The foregoing describes in detail the methods for configuring the sidelink transmission resource provided in the embodiments of this application. The following describes communications apparatuses provided in this application.

Figure 9:
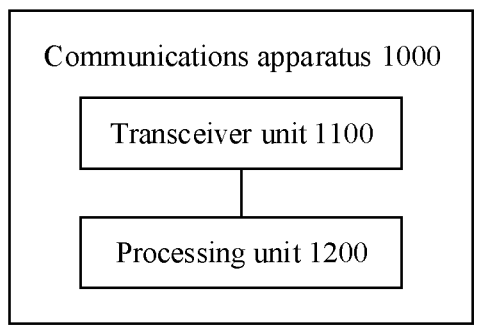
FIG. 9 is a diagram of a communications apparatus 1000 according to this application.

FIG. 9 is a diagram of a communications apparatus 1000 according to this application. As shown in FIG. 9, the communications apparatus 1000 includes a transceiver unit 1100 and a processing unit 1200.

The transceiver unit 1100 is configured to receive downlink control information DCI from a network device, where the DCI includes first indication information and/or second indication information, the first indication information is used to indicate a time domain resource on which the first terminal apparatus sends sidelink hybrid automatic repeat request HARQ information to the network device, and the second indication information is used to indicate a frequency domain resource on which the first terminal apparatus sends the HARQ information to the network device.

The transceiver unit 1100 is further configured to receive the sidelink HARQ information from a second terminal apparatus.

The processing unit 1200 is configured to control, based on the first indication information and/or the second indication information, the transceiver unit 110 to send the HARQ information to the network device.

Optionally, the transceiver unit 1100 may alternatively be replaced with a sending unit or a receiving unit. For example, when performing a sending action, the transceiver unit 1100 may be replaced with the sending unit. When performing a receiving action, the transceiver unit 1100 may be replaced with the receiving unit.

Optionally, in an embodiment, that the first indication information is used to indicate a time domain resource on which the first terminal apparatus sends the sidelink HARQ information to the network device includes:

The first indication information is used to indicate a time interval from a time domain resource on which the first terminal apparatus receives the HARQ information sent by the second terminal apparatus to the time domain resource on which the first terminal apparatus sends the HARQ information to the network device.

Optionally, in an embodiment, that the first indication information is used to indicate a time interval from a time domain resource on which the first terminal apparatus receives the HARQ information sent by the second terminal apparatus to the time domain resource on which the first terminal apparatus sends the HARQ information to the network device includes:

The first indication information includes a first field or a second field, the first field is used to indicate one first time interval, and the second field is used to indicate one second time interval, where
- the first time interval is a time interval from a first time domain resource to a second time domain resource, the first time domain resource is a time domain resource on which the first terminal apparatus receives first HARQ information from the second terminal apparatus, the second time domain resource is a time domain resource on which the first terminal apparatus sends the first HARQ information to the network device, and the first HARQ information is feedback information for a PSCCH on which an initial transmission is performed and/or a PSSCH on which an initial transmission is performed; and
- the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

Optionally, in an embodiment, that the first indication information is used to indicate a time interval from a time domain resource on which the first terminal apparatus receives the HARQ information sent by the second terminal apparatus to the time domain resource on which the first terminal apparatus sends the HARQ information to the network device includes:

The first indication information includes a first field and one or more second fields, the first field is used to indicate a first time interval, and the one or more second fields are used to indicate one or more second time intervals, where
- the first time interval is a time interval from a first time domain resource to a second time domain resource, the first time domain resource is a time domain resource on which the first terminal apparatus receives first HARQ information from the second terminal apparatus, the second time domain resource is a time domain resource on which the first terminal apparatus sends the first HARQ information to the network device, and the first HARQ information is feedback information for a PSCCH on which an initial transmission is performed and/or a PSSCH on which an initial transmission is performed; and
- the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

Optionally, in an embodiment, that the first indication information is used to indicate a time interval from a time domain resource on which the first terminal apparatus receives the HARQ information sent by the second terminal apparatus to the time domain resource on which the first terminal apparatus sends the HARQ information to the network device includes:

The first indication information includes a plurality of second fields, and the plurality of second fields are used to indicate one or more second time intervals, where
- the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

Optionally, in an embodiment, that the second indication information is used to indicate a frequency domain resource on which the first terminal apparatus sends the HARQ information to the network device includes:

The second indication information is used to indicate a PUCCH resource on which the first terminal apparatus sends the HARQ information to the network device, and the PUCCH resource satisfies one of the following conditions:
- the PUCCH resource belongs to a first PUCCH resource pool, and the PUCCH resource pool is used to feed back the sidelink HARQ information and downlink HARQ information; or the PUCCH resource belongs to a first subset of the first PUCCH resource pool, the first PUCCH resource pool includes the first subset and a second subset, and the second subset is used to feed back the downlink HARQ information; or the PUCCH resource belongs to a second PUCCH resource pool, and there is no intersection between the second PUCCH resource pool and the first PUCCH resource pool.

Optionally, in an embodiment, that the second indication information is used to indicate a physical uplink control channel PUCCH resource on which the first terminal apparatus sends the HARQ information to the network device includes:

The second indication information includes a third field or a fourth field, the third field is used to indicate one first PUCCH resource, and the fourth field is used to indicate one second PUCCH resource, where the first PUCCH resource is used by the first terminal apparatus to send the first HARQ information to the network device, and the first HARQ information is the feedback information for the PSCCH on which the initial transmission is performed and/or the PSSCH on which the initial transmission is performed; and the second PUCCH resource is used by the first terminal apparatus to send the second HARQ information to the network device, and the second HARQ information is the feedback information for the PSCCH on which the retransmission is performed and/or the PSSCH on which the retransmission is performed.

Optionally, in an embodiment, that the second indication information is used to indicate a physical uplink control channel PUCCH resource on which the first terminal apparatus sends the HARQ information to the network device includes:

The second indication information includes a third field and one or more fourth fields, the third field is used to indicate one first PUCCH resource, and the fourth field is used to indicate one second PUCCH resource, where the first PUCCH resource is used by the first terminal apparatus to send the first HARQ information to the network device, and the first HARQ information is the feedback information for the PSCCH on which the initial transmission is performed and/or the PSSCH on which the initial transmission is performed; and the second PUCCH resource is used by the first terminal apparatus to send the second HARQ information to the network device, and the second HARQ information is the feedback information for the PSCCH on which the retransmission is performed and/or the PSSCH on which the retransmission is performed.

Optionally, in an embodiment, that the second indication information is used to indicate a PUCCH resource on which the first terminal apparatus sends the HARQ information to the network device includes:

The second indication information includes a plurality of fourth fields, and the plurality of fourth fields are used to indicate one or more second PUCCH resources, where the second PUCCH resource is used by the first terminal apparatus to send the second HARQ information to the network device, and the second HARQ information is the feedback information for the PSCCH on which the retransmission is performed and/or PSSCH on which the retransmission is performed.

Optionally, in an embodiment, the DCI further includes third indication information, the DCI further includes third indication information, the third indication information is used to indicate a third time interval, the third time interval is a time interval from a fifth time domain resource to a sixth time domain resource, the fifth time domain resource is a time domain resource on which the first terminal apparatus receives the DCI from the network device, and the sixth time domain resource is a time domain resource on which the first terminal apparatus sends the PSCCH and/or the PSSCH to the second terminal apparatus; and the processing unit 1200 is further configured to control, based on the third indication information, the transceiver unit 1100 to send the PSCCH and/or the PSSCH to the second terminal apparatus.

Optionally, in an embodiment, that the third indication information is used to indicate a third time interval includes:

The third indication information is used to indicate a first time domain offset parameter, and the first time domain offset parameter and the third time interval satisfy the following formula:

$$\Delta = T_{DL} - N_{TA}/2 \cdot T_C + (k+m_k) \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, and μ is determined based on a subcarrier spacing of the first terminal apparatus; and the processing unit 1200 is further configured to: determine the third time interval based on the first time domain offset parameter and the formula, and control the transceiver unit 1100 to send the PSCCH and/or the PSSCH to the second terminal apparatus on a time domain resource after the third time interval.

Optionally, in an embodiment, that the third indication information is used to indicate a third time interval includes:

The third indication information is used to indicate a second time domain offset parameter, and the second time domain offset parameter and the time interval satisfy the following formula:

$$\Delta = T_{DL} - N_{TA}/2 \cdot T_C + K \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, μ is determined based on a subcarrier spacing of the first terminal apparatus, and $K=k+m_k$; and the processing unit 1200 is further configured to: determine the third time interval based on the second time domain offset parameter and the formula, and control the transceiver unit 1100 to send the PSCCH and/or the PSSCH to the second terminal apparatus on a time domain resource after the third time interval.

Optionally, in an embodiment, the time domain resource after the third time interval is the $1^{st}$ available time domain resource in a sidelink time domain resource pool, and the time domain resource pool does not include a downlink time domain resource or a reserved time domain resource.

In an implementation, the communications apparatus 1000 may be a transmit end device in sidelink communication, for example, a terminal device, or a combined device or a component, in the terminal device, that can implement the method function of the first terminal apparatus. In this implementation, the receiving unit 1100 may be a transceiver. The transceiver may include a receiver and a transmitter. The processing unit 1200 may be a processing apparatus.

In another implementation, the communications apparatus 1000 may be a chip or an integrated circuit installed in a transmit end device. In this implementation, the transceiver unit 1100 may be a communications interface. For example, the transceiver unit 1100 may be an input/output interface or an input/output circuit. The input/output interface may include an input interface and an output interface. The input/output circuit may include an input circuit and an output circuit. The processing unit 1200 may be a processing apparatus.

A function of the processing apparatus may be implemented by hardware, or may be implemented by hardware by executing corresponding software. For example, the processing apparatus may include a memory and a processor. The memory is configured to store a computer program, and the processor reads and executes the computer program stored in the memory, so that the communications apparatus 1000 performs an operation and/or processing performed by the first terminal apparatus in the method embodiments.

Optionally, the processing apparatus may include only the processor, and the memory configured to store the computer program is located outside the processing apparatus. The processor is connected to the memory through a circuit/cable, to read and execute the computer program stored in the memory.

Optionally, the transceiver unit 1100 may be a radio frequency apparatus, and the processing unit 1200 may be a baseband apparatus.

Figure 10:
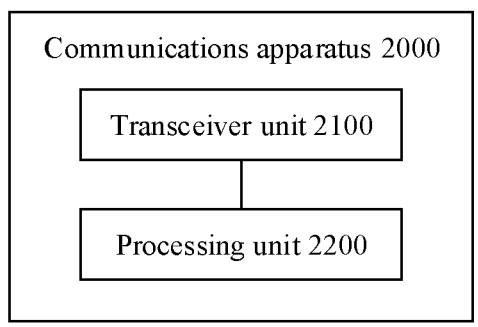
FIG. 10 is a diagram of a communications apparatus 2000 according to this application.

FIG. 10 is a diagram of a communications apparatus 2000 according to this application. As shown in FIG. 10, the communications apparatus 2000 includes a transceiver unit 2100 and a processing unit 2200.

The transceiver unit 2100 is configured to send DCI to a first terminal apparatus, where the DCI includes first indication information and/or second indication information.

The processing unit 2200 is configured to control, based on the first indication information and/or the second indication information, the transceiver unit 2100 to receive HARQ information from the first terminal apparatus.

Optionally, the transceiver unit 2100 may alternatively be replaced with a sending unit or a receiving unit. For example, when performing a sending action, the transceiver unit 2100 may be replaced with the sending unit. When performing a receiving action, the transceiver unit 2100 may be replaced with the receiving unit.

Optionally, in an embodiment, that the first indication information is used to indicate a time domain resource on which the first terminal apparatus sends the sidelink HARQ information to the network device includes:

The first indication information is used to indicate a time interval from a time domain resource on which the first terminal apparatus receives the HARQ information sent by a second terminal apparatus to the time domain resource on which the first terminal apparatus sends the HARQ information to the network device.

Optionally, in an embodiment, that the first indication information is used to indicate a time interval from a time domain resource on which the first terminal apparatus receives the HARQ information sent by a second terminal apparatus to the time domain resource on which the first terminal apparatus sends the HARQ information to the network device includes:

The first indication information includes a first field or a second field, the first field is used to indicate one first time interval, and the second field is used to indicate one second time interval, where the first time interval is a time interval from a first time domain resource to a second time domain resource, the first time domain resource is a time domain resource on which the first terminal apparatus receives first HARQ information from the second terminal apparatus, the second time domain resource is a time domain resource on which the first terminal apparatus sends the first HARQ information to the network device, and the first HARQ information is feedback information for a PSCCH on which an initial transmission is performed and/or a PSSCH on which an initial transmission is performed; and the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

Optionally, in an embodiment, that the first indication information is used to indicate a time interval from a time domain resource on which the first terminal apparatus receives the HARQ information sent by a second terminal apparatus to the time domain resource on which the first terminal apparatus sends the HARQ information to the network device includes:

The first indication information includes a first field and one or more second fields, the first field is used to indicate a first time interval, and the one or more second fields are used to indicate one or more second time intervals, where the first time interval is a time interval from a first time domain resource to a second time domain resource, the first time domain resource is a time domain resource on which the first terminal apparatus receives first HARQ information from the second terminal apparatus, the second time domain resource is a time domain resource on which the first terminal apparatus sends the first HARQ information to the network device, and the first HARQ information is feedback information for a PSCCH on which an initial transmission is performed and/or a PSSCH on which an initial transmission is performed; and the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

Optionally, in an embodiment, that the first indication information is used to indicate a time interval from a time domain resource on which the first terminal apparatus receives the HARQ information sent by a second terminal apparatus to the time domain resource on which the first terminal apparatus sends the HARQ information to the network device includes:

The first indication information includes a plurality of second fields, the plurality of second fields are used to indicate one or more second time intervals, and the one or more second fields are used to indicate the one or more second time intervals, where the second time interval is a time interval from a third time domain resource to a fourth time domain resource, the third time domain resource is a time domain resource on which the first terminal apparatus receives second HARQ information from the second terminal apparatus, the fourth time domain resource is a time domain resource on which the first terminal apparatus sends the second HARQ information to the network device, and the second HARQ information is feedback information for a PSCCH on which a retransmission is performed and/or a PSSCH on which a retransmission is performed.

Optionally, in an embodiment, that the second indication information is used to indicate a frequency domain resource on which the first terminal apparatus sends the HARQ information to the network device includes:

The second indication information is used to indicate a PUCCH resource on which the first terminal apparatus sends the HARQ information to the network device, and the PUCCH resource satisfies one of the following conditions:

the PUCCH resource belongs to a first PUCCH resource pool, and the PUCCH resource pool is used to feed back the sidelink HARQ information and downlink HARQ information; or the PUCCH resource belongs to a first subset of the first PUCCH resource pool, the first PUCCH resource pool includes the first subset and a second subset, and the second subset is used to feed back the downlink HARQ information; or the PUCCH resource belongs to a second PUCCH resource pool, and there is no intersection between the second PUCCH resource pool and the first PUCCH resource pool.

Optionally, in an embodiment, that the second indication information is used to indicate a physical uplink control channel PUCCH resource on which the first terminal apparatus sends the HARQ information to the network device includes:

The second indication information includes a third field or a fourth field, the third field is used to indicate one first PUCCH resource, and the fourth field is used to indicate one second PUCCH resource, where the first PUCCH resource is used by the first terminal apparatus to send the first HARQ information to the network device, and the first HARQ information is the feedback information for the PSCCH on which the initial transmission is performed and/or the PSSCH on which the initial transmission is performed; and the second PUCCH resource is used by the first terminal apparatus to send the second HARQ information to the network device, and the second HARQ information is the feedback information for the PSCCH on which the retransmission is performed and/or the PSSCH on which the retransmission is performed.

Optionally, in an embodiment, that the second indication information is used to indicate a physical uplink control channel PUCCH resource on which the first terminal apparatus sends the HARQ information to the network device includes:

The second indication information includes a third field and one or more fourth fields, the third field is used to indicate one first PUCCH resource, and the fourth field is used to indicate one second PUCCH resource, where the first PUCCH resource is used by the first terminal apparatus to send the first HARQ information to the network device, and the first HARQ information is the feedback information for the PSCCH on which the initial transmission is performed and/or the PSSCH on which the initial transmission is performed; and the second PUCCH resource is used by the first terminal apparatus to send the second HARQ information to the network device, and the second HARQ information is the feedback information for the PSCCH on which the retransmission is performed and/or the PSSCH on which the retransmission is performed.

Optionally, in an embodiment, that the second indication information is used to indicate a PUCCH resource on which the first terminal apparatus sends the HARQ information to the network device includes:

The second indication information includes a plurality of fourth fields, and the plurality of fourth fields are used to indicate one or more second PUCCH resources, where the second PUCCH resource is used by the first terminal apparatus to send the second HARQ information to the network device, and the second HARQ information is the feedback information for the PSCCH on which the retransmission is performed and/or the PSSCH on which the retransmission is performed.

Optionally, in an embodiment, the DCI further includes third indication information, the DCI further includes third indication information, the third indication information is used to indicate a third time interval, the third time interval is a time interval from a fifth time domain resource to a sixth time domain resource, the fifth time domain resource is a time domain resource on which the first terminal apparatus receives the DCI from the network device, and the sixth time domain resource is a time domain resource on which the first terminal apparatus sends the PSCCH and/or the PSSCH to the second terminal apparatus; and the processing unit 1200 is further configured to control, based on the third indication information, the transceiver unit 1100 to send the PSCCH and/or the PSSCH to the second terminal apparatus.

Optionally, in an embodiment, that the third indication information is used to indicate a third time interval includes:

The third indication information is used to indicate a first time domain offset parameter, and the first time domain offset parameter and the third time interval satisfy the following formula:

$$\Delta = T_{DL} - N_{TA}/2 \cdot T_C + (k+m_k) \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, and $\mu$ is determined based on a subcarrier spacing of the first terminal apparatus.

Optionally, in an embodiment, that the third indication information is used to indicate a third time interval includes:

The third indication information is used to indicate a second time domain offset parameter, and the second time domain offset parameter and the time interval satisfy the following formula:

$$\Delta = T_{DL} - N_{TA}/2 \cdot T_C + K \cdot 10^{-3}/2^\mu, \text{ where}$$

$\Delta$ represents the third time interval, $T_{DL}$ represents the time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, µ is determined based on a subcarrier spacing of the first terminal apparatus, and $K=k+m_k$.

For a value of the parameter in the foregoing formula, refer to the method embodiments. Details are not described herein again.

Optionally, in an embodiment, the time domain resource after the third time interval is the $1^{st}$ available time domain resource in a sidelink time domain resource pool, and the time domain resource pool does not include a downlink time domain resource or a reserved time domain resource.

In an implementation, the terminal apparatus 2000 may be a network device, for example, a gNB, or a combined device or component, in the gNB, that can implement the method function of the network device. In this implementation, the receiving unit 2100 may be a transceiver. The transceiver may include a receiver and a transmitter. The processing unit 2200 may be a processing apparatus.

In another implementation, the terminal apparatus 2000 may be a chip or an integrated circuit installed in the network device. In this implementation, the transceiver unit 2100 may be a communications interface. For example, the transceiver unit 2100 may be an input/output interface or an input/output circuit. The input/output interface may include an input interface and an output interface. The input/output circuit may include an input circuit and an output circuit. The processing unit 2200 may be a processing apparatus.

A function of the processing apparatus may be implemented by hardware, or may be implemented by hardware by executing corresponding software. For example, the processing apparatus may include a memory and a processor. The memory is configured to store a computer program, and the processor reads and executes the computer program stored in the memory, so that the communications apparatus 2000 performs an operation and/or processing performed by the network device in the method embodiments.

Optionally, the processing apparatus may include only the processor, and the memory configured to store the computer program is located outside the processing apparatus. The processor is connected to the memory through a circuit/cable, to read and execute the computer program stored in the memory.

Optionally, the transceiver unit 2100 may be a radio frequency apparatus, and the processing unit 2200 may be a baseband apparatus.

Figure 11:
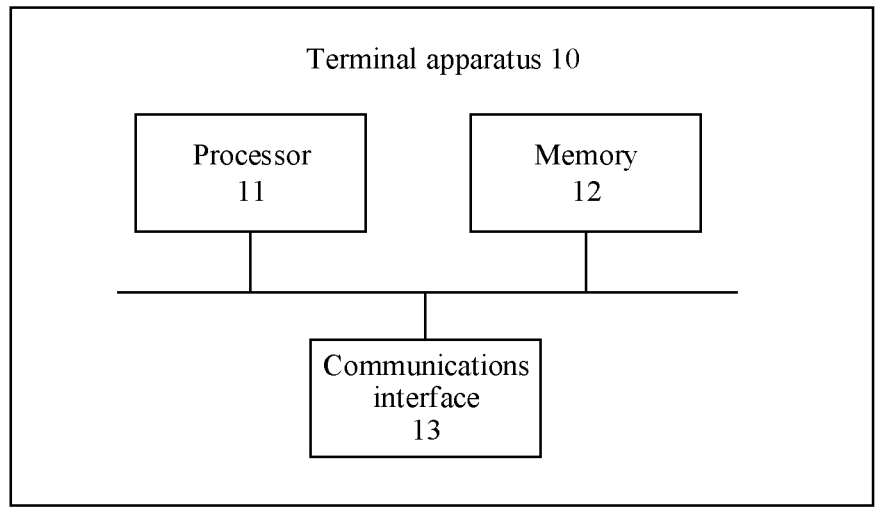
FIG. 11 is a diagram of a terminal apparatus 10 according to this application.

FIG. 11 is a diagram of a terminal apparatus 10 according to this application. As shown in FIG. 11, the terminal apparatus 10 includes one or more processors 11, one or more memories 12, and one or more communications interfaces 13. The processor 11 is configured to control the communications interface 13 to send and receive a signal. The memory 12 is configured to store a computer program. The processor 11 is configured to: invoke the computer program from the memory 12 and run the computer program, to perform a procedure and/or an operation performed by the first terminal apparatus in the method embodiments for configuring the sidelink transmission resource in this application.

For example, the processor 11 may have a function of the processing unit 1200 shown in FIG. 9, and the communications interface 13 may have a function of the transceiver unit 1100 shown in FIG. 9. For details, refer to the descriptions in FIG. 9. Details are not described herein again.

When the communications interface 13 implements the function of the transceiver unit 1100, the communications interface 13 relates to DCI receiving; or when the processor 11 implements the function of the processing unit 1200, the processor 11 relates to processing of the DCI, the first indication information, the second indication information, the third indication information, or the like. For descriptions of the DCI, the first indication information, the second indication information, and the third indication information, refer to the method embodiments. To avoid repetition, details are not described herein again.

Optionally, when the terminal apparatus 10 is a chip or an integrated circuit installed in a sidelink transmit end device, the terminal apparatus 10 may include one or more processors 11 and one or more communications interfaces 13. One or more memories 12 may be located outside the terminal apparatus 10.

Optionally, when the terminal apparatus 10 is a sidelink transmit end device, the processor 11 may be a baseband apparatus installed in the transmit end device, and the communications interface 13 may be a radio frequency apparatus.

Figure 12:
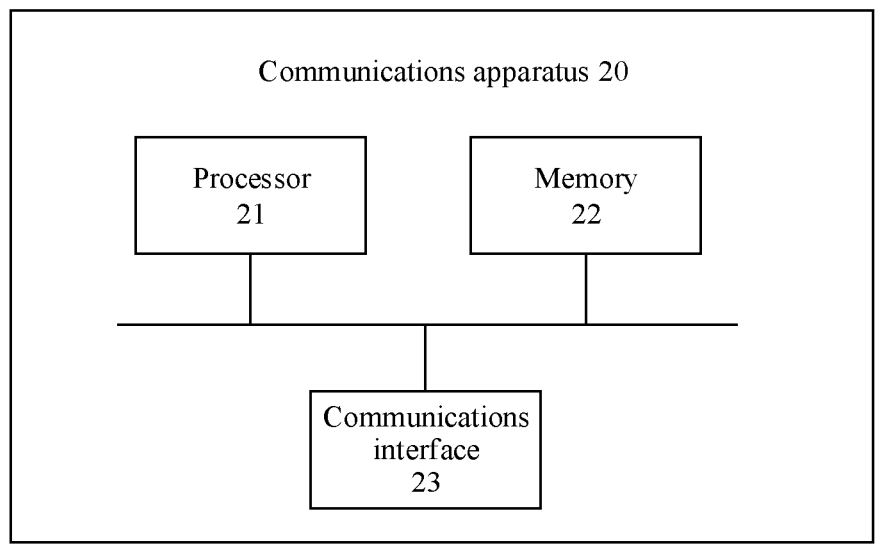
FIG. 12 is a diagram of a communications apparatus 20 according to this application.

FIG. 12 is a diagram of a communications apparatus 20 according to this application. As shown in FIG. 12, the communications apparatus 20 includes one or more processors 21, one or more memories 22, and one or more communications interfaces 23. The processor 21 is configured to control the communications interface 23 to send and receive a signal. The memory 22 is configured to store a computer program. The processor 21 is configured to: invoke the computer program from the memory 22 and run the computer program, to perform a procedure and/or an operation performed by the network device in the method embodiments for configuring the sidelink transmission resource in this application.

For example, the processor 21 may have a function of the processing unit 2200 shown in FIG. 10, and the communications interface 23 may have a function of the transceiver unit 2100 shown in FIG. 10. For details, refer to the descriptions in FIG. 9. Details are not described herein again.

When the communications interface 23 implements the function of the transceiver unit 2100, the communications interface 23 relates to DCI sending; or when the processor 21 implements the function of the processing unit 2200, the processor 21 relates to processing of the DCI, the first indication information, the second indication information, the third indication information, or the like. For descriptions of the DCI, the first indication information, the second indication information, and the third indication information, refer to the method embodiments. To avoid repetition, details are not described herein again.

Optionally, when the communications apparatus 20 is a chip or an integrated circuit installed in the network device, the communications apparatus 20 may include the one or more processors 21 and the one or more communications interfaces 23. The one or more memories 22 may be located outside the communications apparatus 20.

Optionally, the memory and the processor in the foregoing apparatus embodiments may be physically independent units, or the memory and the processor may be integrated together.

In addition, this application further provides a computer-readable storage medium. The computer-readable storage medium stores a computer instruction. When the computer instruction is run on a computer, the computer is enabled to perform an operation and/or a procedure performed by the first terminal apparatus in the method embodiments of this application.

This application further provides a computer-readable storage medium. The computer-readable storage medium stores a computer instruction. When the computer instruction is run on a computer, the computer is enabled to perform an operation and/or a procedure performed by the network device in the method embodiments of this application.

This application further provides a computer program product. The computer program product includes computer program code. When the computer program code is run on a computer, the computer is enabled to perform an operation and/or a procedure performed by the first terminal apparatus in the method embodiments of this application.

This application further provides a computer program product. The computer program product includes computer program code. When the computer program code is run on a computer, the computer is enabled to perform an operation and/or a procedure performed by the network device in the method embodiments of this application.

This application further provides a chip, and the chip includes a processor. A memory configured to store a computer program is disposed independent of the chip. The processor is configured to execute the computer program stored in the memory, to perform an operation and/or processing performed by the first terminal apparatus in any method embodiment.

Further, the chip may further include a communications interface. The communications interface may be an input/output interface, an input/output circuit, or the like. Further, the chip may further include the memory.

This application further provides a chip, and the chip includes a processor. A memory configured to store a computer program is disposed independent of the chip. The processor is configured to execute the computer program stored in the memory, to perform an operation and/or processing performed by the network device in any method embodiment.

Further, the chip may further include a communications interface. The communications interface may be an input/output interface, an input/output circuit, or the like. Further, the chip may further include the memory.

In addition, this application further provides a wireless communications system, including the first terminal apparatus and the network device in the embodiments of this application. Optionally, the wireless communications system may further include the second terminal apparatus in the embodiments of this application.

The processor in the embodiments of this application may be an integrated circuit chip, and has a signal processing capability. In an implementation process, the steps in the foregoing method embodiments may be completed by using a hardware integrated logic circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor or any conventional processor or the like. The steps of the methods disclosed in the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example and not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus™ random access memory (DRRAM).

The terms such as "unit", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network such as the Internet interacting with another system by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions need to be performed by hardware or software depends on a particular application and a design constraint condition of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the system, apparatus, and unit, refer to corresponding processes in the method embodiments, and details are not described again.

For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method for configuring a sidelink transmission resource, comprising:
   receiving, by a first terminal apparatus, downlink control information (DCI) from a network device, the DCI comprising first indication information or both of the first indication information and second indication information, the first indication information indicating a sidelink hybrid automatic repeat request (HARQ) send time domain resource on which the first terminal apparatus sends sidelink hybrid HARQ information to the network device, the first indication information indicating a first time interval from a HARQ receive time domain resource on which the first terminal apparatus receives the HARQ information sent by the second terminal apparatus, to the HARQ send time domain resource on which the first terminal apparatus sends the HARQ information to the network device, and the second indication information indicating a frequency domain resource on which the first terminal apparatus sends the HARQ information to the network device;
   receiving, by the first terminal apparatus, the HARQ information from the second terminal apparatus; and
   sending, by the first terminal apparatus, the HARQ information to the network device based on the first indication information or both the first indication information and the second indication information.

2. The method according to claim 1, wherein the DCI further comprises third indication information indicating a second time interval from a first time domain resource to a second time domain resource, the first terminal apparatus receives the DCI from the network device on the first time domain resource, and the first terminal apparatus sends one or both of a physical sidelink control channel (PSCCH) or a physical sidelink shared channel (PSSCH) to the second terminal apparatus on the second time domain resource; and
   before the receiving, by the first terminal apparatus, the sidelink HARQ information from the second terminal apparatus, the method further comprises:
   sending, by the first terminal apparatus, the one or both of the PSCCH or the PSSCH to the second terminal apparatus based on the third indication information.

3. The method according to claim 2, wherein the third indication information indicating the second time interval comprises:
   the third indication information indicating a first time domain offset parameter, and the first time domain offset parameter and the second time interval satisfy the following formula:
   $\Delta = T_{DL} - N_{TA}/2 \cdot T_C + (k+m_k) \cdot 10^{-3}/2^\mu$, wherein $\Delta$ represents the second time interval, $T_{DL}$ represents the first time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, $\mu$ is determined based on a subcarrier spacing of the first terminal apparatus, and $T_C = 1/(\Delta f_{max} \cdot N_f)$, where $\Delta f_{max} = 480 \cdot 10^3$ Hz and $N_f = 4096$; and
   the sending, by the first terminal apparatus, the one or both of the PSCCH or the PSSCH to the second terminal apparatus based on the third indication information comprises:
   determining, by the first terminal apparatus, the second time interval according to the first time domain offset parameter and the formula; and
   sending, by the first terminal apparatus, the one or both of the PSCCH or the PSSCH to the second terminal apparatus on a third time domain resource after the second time interval.

4. The method according to claim 3, wherein the third time domain resource after the second time interval comprises the 1$^{st}$ available time domain resource in a sidelink time domain resource pool, and the sidelink time domain resource pool does not comprise a downlink time domain resource or a reserved time domain resource.

5. The method according to claim 3, wherein a value of k is signaled by radio resource control (RRC) signaling and the value of k is 0, 1, 2, 3 or 4.

6. A method for configuring a sidelink transmission resource, comprising:
   sending, by a network device, downlink control information (DCI) to a first terminal apparatus, the DCI comprising first indication information or both of the first indication information and second indication information, the first indication information indicating a sidelink hybrid automatic repeat request (HARQ) send time domain resource on which the first terminal apparatus sends HARQ information to the network device, the first indication information indicating a first time interval from a HARQ receive time domain resource on which the first terminal apparatus receives the HARQ information sent by the second terminal apparatus, to the HARQ send time domain resource on which the first terminal apparatus sends the HARQ information to the network device, and the second indication information indicating a frequency domain resource on which the first terminal apparatus sends the HARQ information to the network device; and receiving, by the network device, the HARQ information from the first terminal apparatus based on the first indication information or both the first indication information and the second indication information.

7. The method according to claim 6, wherein the DCI further comprises third indication information indicating a second time interval from a first time domain resource to a second time domain resource, the first terminal apparatus receives the DCI from the network device on the first time domain resource, and the first terminal apparatus sends one or both of a physical sidelink control channel (PSCCH) or a physical sidelink shared channel (PSSCH) to the second terminal apparatus on the second time domain resource.

8. The method according to claim 7, wherein the third indication information indicating the second time interval comprises:

the third indication information indicating a first time domain offset parameter, and the first time domain offset parameter and the second time interval satisfy the following formula:

$\Delta = T_{DL} - N_{TA}/2 \cdot T_C + (k+m_k) \cdot 10^{-3}/2^\mu$, wherein $\Delta$ represents the second time interval, $T_{DL}$ represents the first time domain resource on which the first terminal apparatus receives the DCI from the network device, $N_{TA}$ represents a timing advance relative to $T_{DL}$, k represents a time domain offset relative to $T_{DL}$, $m_k$ represents the first time domain offset parameter, $\mu$ is determined based on a subcarrier spacing of the first terminal apparatus, and $T_C = 1/(\Delta f_{max} \cdot N_f)$, where $\Delta f_{max} = 480 \cdot 10^3$ Hz and $N_f = 4096$.

9. The method according to claim 8, wherein the one or both of the PSCCH or the PSSCH are sent by the first terminal apparatus to the second terminal apparatus on a third time domain resource after the second time interval, and the third time domain resource after the second time interval comprises the 1st available time domain resource in a sidelink time domain resource pool, and the sidelink time domain resource pool does not comprise a downlink time domain resource or a reserved time domain resource.

10. The method according to claim 8, wherein a value of k is signaled by radio resource control (RRC) signaling and the value of k is 0, 1, 2, 3 or 4.

11. A first apparatus, comprising:

a non-transitory memory storing instructions; and at least one processor in communication with the memory, the at least one processor configured, upon execution of the instructions, to perform the following steps:

receiving downlink control information (DCI) from a network device, the DCI comprising first indication information or both of the first indication information and second indication information, the first indication information indicating a sidelink hybrid automatic repeat request (HARQ) send time domain resource on which the first apparatus sends HARQ information to the network device, the first indication information indicating a first time interval from a HARQ receive time domain resource on which the first terminal apparatus receives the HARQ information sent by the second terminal apparatus, to the HARQ send time domain resource on which the first terminal apparatus sends the HARQ information to the network device, and the second indication information indicating a frequency domain resource on which the first apparatus sends the HARQ information to the network device;

receiving the HARQ information from a second apparatus; and sending the HARQ information to the network device based on the first indication information or both the first indication information and the second indication information.

12. The first apparatus according to claim 11, wherein the DCI further comprises third indication information indicating a second time interval from a first time domain resource to a second time domain resource, the first apparatus receives the DCI from the network device on the first time domain resource, and the first apparatus sends one or both of a physical sidelink control channel (PSCCH) or a physical sidelink shared channel (PSSCH) to the second apparatus on the second time domain resource; and wherein the at least one processor further executes the instructions to perform:

sending the one or both of the PSCCH or the PSSCH to the second apparatus based on the third indication information.

13. The first apparatus according to claim 12, wherein the third indication information indicating the second time interval comprises:

the third indication information indicating a first time domain offset parameter, and the first time domain offset parameter and the second time interval satisfy the following formula:

$\Delta = T_{DL} - N_{TA}/2 \cdot T_C + (k+m_k) \cdot 10^{-3}/2^\mu$, wherein $\Delta$ represents the second time interval, $T_{DL}$ represents the first time domain resource on which the first apparatus receives the DCI from the network device, $N_{TA}$ represents a timing advance relative to $T_{DL}$, k represents a time domain offset relative to $T_{DL}$, $m_k$ represents the first time domain offset parameter, $\mu$ is determined based on a subcarrier spacing of the first apparatus, and $T_C = 1/(\Delta f_{max} \cdot N_f)$, where $\Delta f_{max} = 480 \cdot 10^3$ Hz and $N_f = 4096$; and the sending the one or both of the PSCCH or the PSSCH to the second apparatus based on the third indication information comprises:

determining the second time interval according to the first time domain offset parameter and the formula; and sending the one or both of the PSCCH or the PSSCH to the second apparatus on a third time domain resource after the second time interval.

14. The first apparatus according to claim 13, wherein the third time domain resource after the second time interval comprises the 1st available time domain resource in a sidelink time domain resource pool, and the sidelink time domain resource pool does not comprise a downlink time domain resource or a reserved time domain resource.

15. The first apparatus according to claim 13, wherein a value of k is signaled by radio resource control (RRC) signaling and the value of k is 0, 1, 2, 3 or 4.

* * * * *